United States Patent
Fujikawa et al.

(10) Patent No.: US 12,200,361 B2
(45) Date of Patent: *Jan. 14, 2025

(54) IMAGING SUPPORT DEVICE THAT PERFORMS REGISTRATION CONTROL FOR SETTING A DETECTED SUBJECT IMAGE POSITION, IMAGING SUPPORT SYSTEM, IMAGING SYSTEM, IMAGING SUPPORT METHOD, AND PROGRAM

(71) Applicant: FUJIFILM CORPORATION, Tokyo (JP)

(72) Inventors: Tetsuya Fujikawa, Saitama (JP); Shinichiro Fujiki, Saitama (JP); Junichi Tanaka, Saitama (JP); Atsushi Kawanago, Saitama (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/539,310

(22) Filed: Dec. 14, 2023

(65) Prior Publication Data
US 2024/0114245 A1    Apr. 4, 2024

Related U.S. Application Data

(63) Continuation of application No. 17/728,993, filed on Apr. 26, 2022, now Pat. No. 11,895,403, which is a (Continued)

(30) Foreign Application Priority Data
Oct. 29, 2019 (JP) .................................. 2019-196683

(51) Int. Cl.
H04N 23/68    (2023.01)
G02B 27/64    (2006.01)
(Continued)

(52) U.S. Cl.
CPC .......... *H04N 23/687* (2023.01); *H04N 23/61* (2023.01); *H04N 23/64* (2023.01); *G02B 27/646* (2013.01)

(58) Field of Classification Search
CPC ...... H04N 23/687; H04N 23/61; H04N 23/64; H04N 23/6811; H04N 23/6812;
(Continued)

(56) References Cited

U.S. PATENT DOCUMENTS 5,282,044 A    1/1994 Misawa et al.
6,784,927 B1   8/2004 Itokawa
(Continued)

FOREIGN PATENT DOCUMENTS

CN    106164730 A    11/2016
CN    107026960 A    8/2017
(Continued)

OTHER PUBLICATIONS

English language translation of the following: Office action dated Oct. 28, 2023 from the SIPO in a Chinese patent application No. 202080075914.8 corresponding to the instant patent application. This office action translation is submitted now in order to supplement the understanding of the cited references which are being disclosed in the instant Information Disclosure Statement.
(Continued)

*Primary Examiner* — Usman A Khan
(74) *Attorney, Agent, or Firm* — SOLARIS Intellectual Property Group, PLLC

(57) ABSTRACT

An imaging support method includes acquiring a focal length of an imaging apparatus, detecting a subject image position of a target subject image showing a target subject in a captured image obtained by capturing an imaging region including the target subject by the imaging apparatus, and performing registration control for setting the detected sub-
(Continued)

ject image position to a specific position in the captured image by increasing a ratio of application of an image region movement component compared to a lens moving mechanism in a case where the acquired focal length is greater than or equal to a threshold value, and increasing a ratio of application of the lens moving mechanism compared to the image region movement component in a case where the focal length is less than the threshold value.

16 Claims, 22 Drawing Sheets

Related U.S. Application Data continuation of application No. PCT/JP2020/039427, filed on Oct. 20, 2020.

(51) Int. Cl.
*H04N 23/60* (2023.01)
*H04N 23/61* (2023.01)

(58) Field of Classification Search
CPC ...... H04N 23/683; H04N 23/55; H04N 23/67; G02B 27/646; G02B 7/08; G02B 7/02; G03B 5/00; G03B 15/00; G03B 17/00; G03B 17/56; G03B 2205/0007
USPC ..................................................... 348/208.99
See application file for complete search history.

(56) References Cited

U.S. PATENT DOCUMENTS

| | | | |
|---|---|---|---|
| 10,129,464 B1 | 11/2018 | Matias et al. | |
| 2001/0002843 A1* | 6/2001 | Yata | G01S 3/7803 348/169 |
| 2005/0057662 A1 | 3/2005 | Washisu | |
| 2007/0296821 A1 | 12/2007 | Kakkori | |
| 2010/0195207 A1* | 8/2010 | Uchida | G02B 27/0037 359/557 |
| 2014/0333821 A1* | 11/2014 | Hagiwara | G02B 15/173 359/557 |
| 2016/0070115 A1 | 3/2016 | Miller et al. | |
| 2016/0134814 A1 | 5/2016 | Yoneyama | |
| 2017/0013199 A1 | 1/2017 | Kunugi et al. | |
| 2017/0187960 A1 | 6/2017 | Tsuchiya | |
| 2017/0214838 A1 | 7/2017 | Miyazawa et al. | |
| 2019/0158745 A1 | 5/2019 | Idaka | |
| 2019/0199930 A1 | 6/2019 | Noguchi | |
| 2019/0222763 A1* | 7/2019 | Takayanagi | H04N 23/663 |

FOREIGN PATENT DOCUMENTS

| | | |
|---|---|---|
| CN | 110012219 A | 7/2019 |
| JP | H05-14801 A | 1/1993 |
| JP | H09-46575 A | 2/1997 |
| JP | 2006071743 A | 3/2006 |
| JP | 2008199275 A | 8/2008 |
| JP | 2012-247544 A | 12/2012 |
| JP | 2016-090973 A | 5/2016 |
| JP | 2019-091063 A | 6/2019 |
| JP | 2019-095509 A | 6/2019 |
| JP | 2019-125864 A | 7/2019 |

OTHER PUBLICATIONS

English language translation of the following: Office action dated Mar. 2, 2024 from the SIPO in a Chinese patent application No. 202080075914.8 corresponding to the instant patent application.
International Search Report issued in International Application No. PCT/JP2020/039427 on Dec. 28, 2020.
Written Opinion of the ISA issued in International Application No. PCT/JP2020/039427 on Dec. 28, 2020.
Non-Final Office Action issued by USPTO on Mar. 21, 2023, in related U.S. Appl. No. 17/728,993.
Final Office Action issued by USPTO on Jun. 29, 2023, in related U.S. Appl. No. 17/728,993.
Notice of Allowance issued by USPTO on Sep. 20, 2023, in related U.S. Appl. No. 17/728,993.

* cited by examiner

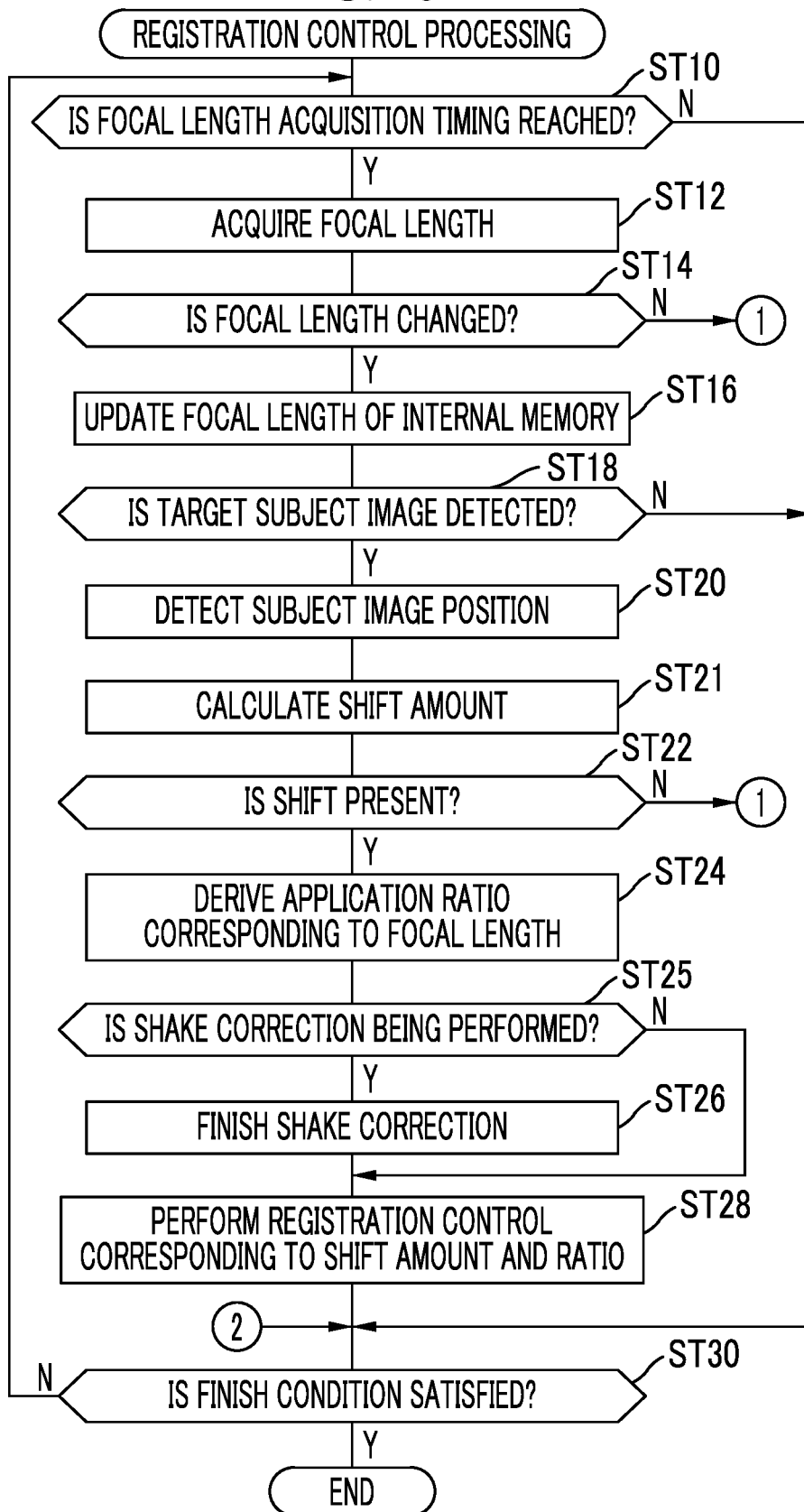

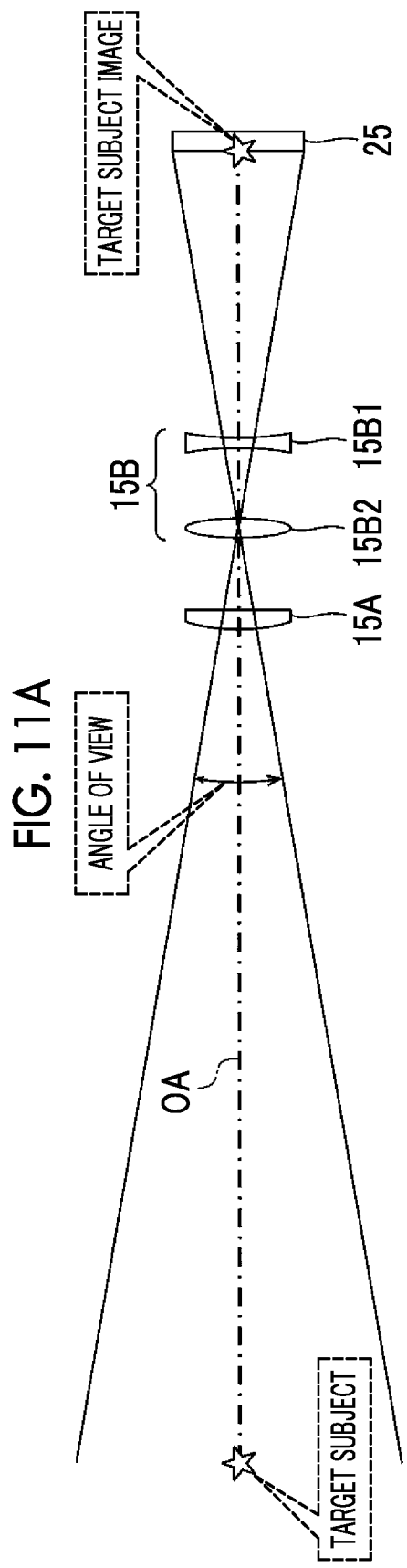

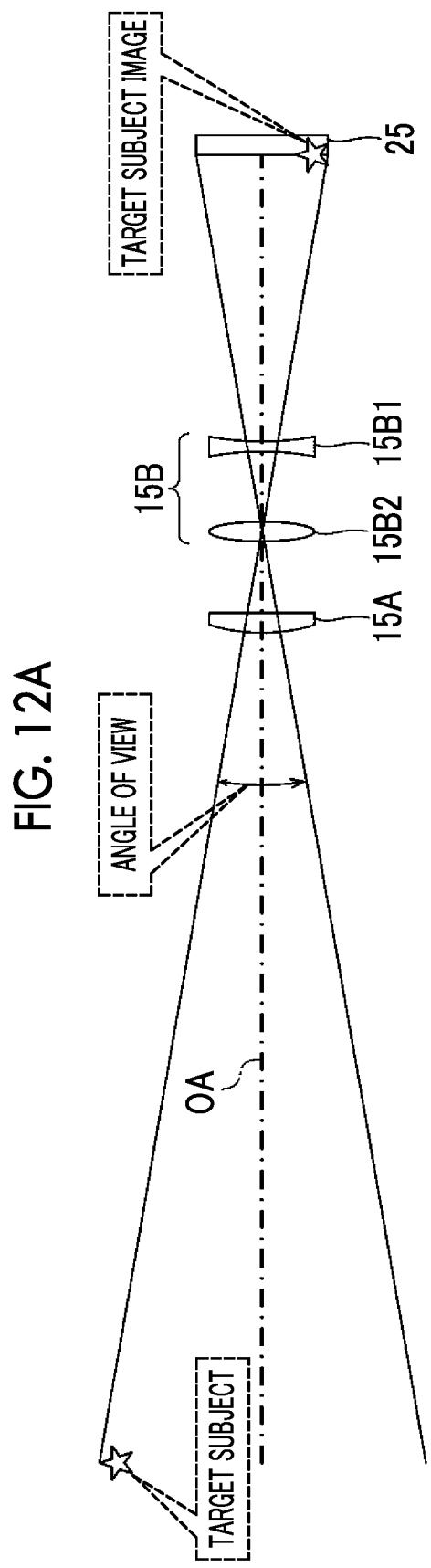

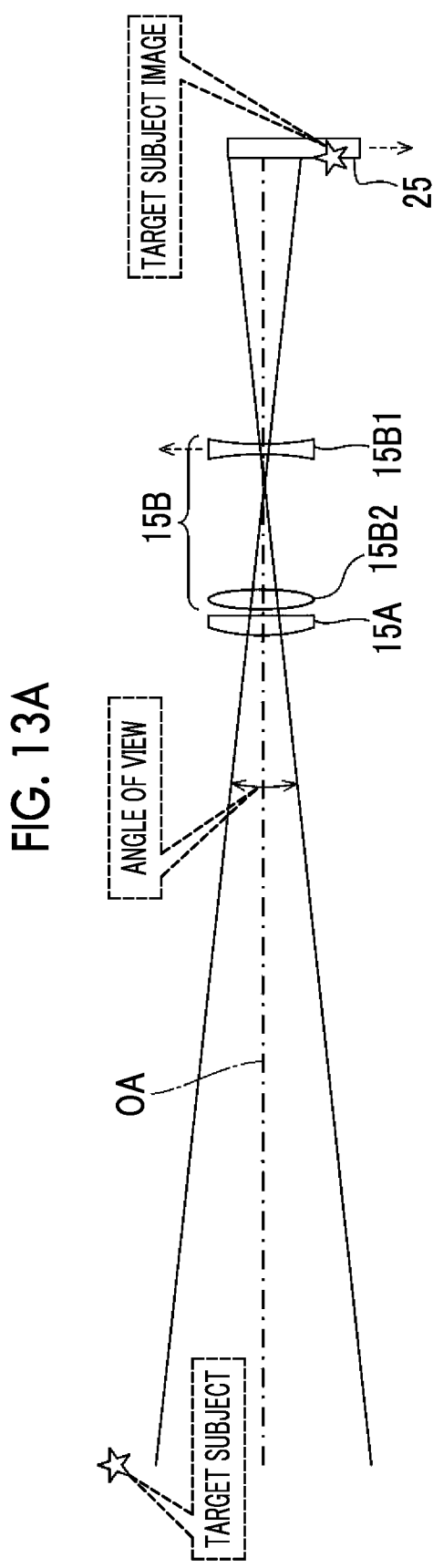

IMAGING SUPPORT DEVICE THAT PERFORMS REGISTRATION CONTROL FOR SETTING A DETECTED SUBJECT IMAGE POSITION, IMAGING SUPPORT SYSTEM, IMAGING SYSTEM, IMAGING SUPPORT METHOD, AND PROGRAM

CROSS-REFERENCE TO RELATED APPLICATIONS

This application is a continuation application of, and claims priority to, U.S. application Ser. No. 17/728,993, filed Apr. 26, 2022, which is a continuation application of International Application No. PCT/JP2020/039427, filed Oct. 20, 2020, the disclosure of which is incorporated herein by reference in its entirety. Further, this application claims priority from Japanese Patent Application No. 2019-196683, filed Oct. 29, 2019, the disclosure of which is incorporated herein by reference in its entirety.

BACKGROUND

1. Technical Field

The disclosed technology relates to an imaging support device, an imaging support system, an imaging system, an imaging support method, and a program.

2. Related Art

JP2016-90973A discloses an imaging apparatus comprising a first anti-vibration control portion that controls a first anti-vibration portion which corrects a camera shake by moving a lens, a second anti-vibration control portion that controls a second anti-vibration portion which corrects the camera shake by moving an imaging element, a wide angle image generation portion that generates a wide angle image based on a plurality of images which are sequentially captured within a moved imaging range by moving the imaging range for wide angle imaging by at least the first anti-vibration control portion or the second anti-vibration control portion, and a setting portion that performs setting of whether to use the first anti-vibration portion and the second anti-vibration portion for correcting the camera shake or for moving the imaging range.

SUMMARY

One embodiment according to the disclosed technology provides an imaging support device, an imaging support system, an imaging system, an imaging support method, and a program that can set a subject image position to a specific position in a captured image with high accuracy compared to a case where a registration control is performed depending on only a lens moving mechanism and an image region movement portion regardless of a focal length.

A first aspect according to the disclosed technology is an imaging support device comprising an acquisition portion that acquires a focal length of an imaging apparatus which includes a lens and an imaging element and includes a lens moving mechanism which moves the lens in a direction intersecting with an optical axis of the lens, and an image region movement portion which moves a region of a captured image in the imaging element in the direction intersecting with the optical axis, a detection portion that detects a subject image position of a target subject image showing a target subject in the captured image obtained by capturing an imaging region including the target subject by the imaging apparatus, and a control portion that performs a registration control of setting the subject image position detected by the detection portion to a specific position in the captured image by increasing a ratio of application of the image region movement portion compared to the lens moving mechanism in a case where the focal length acquired by the acquisition portion is greater than or equal to a threshold value, and increasing a ratio of application of the lens moving mechanism compared to the image region movement portion in a case where the focal length is less than the threshold value.

A second aspect according to the disclosed technology is the imaging support device according to the first aspect, in which the lens moving mechanism is a lens side shake correction mechanism that corrects a shake occurring due to a vibration exerted on the imaging apparatus, by moving the lens, the image region movement portion is an imaging element side shake correction portion that corrects the shake by moving the imaging element or performing image processing on the captured image obtained by imaging performed by the imaging element, and the control portion performs the registration control by increasing a ratio of application of the imaging element side shake correction portion compared to the lens side shake correction mechanism in a case where the focal length is greater than or equal to the threshold value, and increasing a ratio of application of the lens side shake correction mechanism compared to the imaging element side shake correction portion in a case where the focal length is less than the threshold value.

A third aspect according to the disclosed technology is the imaging support device according to the second aspect, in which the control portion causes the lens side shake correction mechanism to correct the shake in a case where the focal length acquired by the acquisition portion is greater than or equal to the threshold value.

A fourth aspect according to the disclosed technology is the imaging support device according to the second or third aspect, in which the control portion causes the imaging element side shake correction portion to correct the shake in a case where the focal length acquired by the acquisition portion is less than the threshold value.

A fifth aspect according to the disclosed technology is the imaging support device according to any one of the first to fourth aspects, in which the imaging apparatus includes a variable magnification mechanism that enables the focal length to change, and the control portion performs the registration control using the imaging element side shake correction portion and the lens side shake correction mechanism together in a case where the focal length acquired by the acquisition portion is changing.

A sixth aspect according to the disclosed technology is the imaging support device according to any one of the first to fifth aspects, in which the control portion causes at least one of the imaging element side shake correction portion or the lens side shake correction mechanism to correct the shake in a case where the focal length acquired by the acquisition portion is not changing.

A seventh aspect according to the disclosed technology is the imaging support device according to any one of the first to sixth aspects, in which the control portion performs the registration control using the lens side shake correction mechanism and the imaging element side shake correction portion together in a case where the focal length acquired by the acquisition portion is within a predetermined range including the threshold value.

An eighth aspect according to the disclosed technology is the imaging support device according to the seventh aspect, in which the registration control is a control including a control of gradually increasing the ratio of application of the imaging element side shake correction portion compared to the lens side shake correction mechanism in accordance with increasing of the focal length in a case where the focal length acquired by the acquisition portion is within the predetermined range.

A ninth aspect according to the disclosed technology is the imaging support device according to the seventh or eighth aspect, in which the control portion performs the registration control using the lens side shake correction mechanism out of the lens side shake correction mechanism and the imaging element side shake correction portion in a case where the focal length acquired by the acquisition portion is less than a lower limit value of the predetermined range.

A tenth aspect according to the disclosed technology is the imaging support device according to any one of the seventh to ninth aspects, in which the control portion performs the registration control using the imaging element side shake correction portion out of the lens side shake correction mechanism and the imaging element side shake correction portion in a case where the focal length acquired by the acquisition portion exceeds an upper limit value of the predetermined range.

An eleventh aspect according to the disclosed technology is the imaging support device according to any one of the first to tenth aspects, in which the control portion performs the registration control using a registration portion including a revolution mechanism that enables the imaging apparatus to revolve, the imaging element side shake correction portion, and the lens side shake correction mechanism, and registration accuracy for adjusting the subject image position in the captured image is higher for the imaging element side shake correction portion and the lens side shake correction mechanism than for the revolution mechanism.

A twelfth aspect according to the disclosed technology is an imaging support system comprising the imaging support device according to the eleventh aspect, and the revolution mechanism, in which the imaging support device supports imaging performed by the imaging apparatus in a case where the revolution mechanism causes the imaging apparatus to revolve.

A thirteenth aspect according to the disclosed technology is an imaging system comprising the imaging support device according to any one of the first to eleventh aspects, and the imaging apparatus, in which the imaging support device supports imaging for the imaging apparatus.

A fourteenth aspect according to the disclosed technology is the imaging system according to the thirteenth aspect, further comprising a revolution mechanism that causes the imaging apparatus to revolve.

A fifteenth aspect according to the disclosed technology is an imaging support method comprising acquiring a focal length of an imaging apparatus which includes a lens and an imaging element and includes a lens moving mechanism which moves the lens in a direction intersecting with an optical axis of the lens, and an image region movement portion which moves a region of a captured image in the imaging element in the direction intersecting with the optical axis, detecting a subject image position of a target subject image showing a target subject in the captured image obtained by capturing an imaging region including the target subject by the imaging apparatus, and performing a registration control of setting the detected subject image position to a specific position in the captured image by increasing a ratio of application of the image region movement portion compared to the lens moving mechanism in a case where the acquired focal length is greater than or equal to a threshold value, and increasing a ratio of application of the lens moving mechanism compared to the image region movement portion in a case where the focal length is less than the threshold value.

A sixteenth aspect according to the disclosed technology is a program causing a computer to execute a process comprising acquiring a focal length of an imaging apparatus which includes a lens and an imaging element and includes a lens moving mechanism which moves the lens in a direction intersecting with an optical axis of the lens, and an image region movement portion which moves a region of a captured image in the imaging element in the direction intersecting with the optical axis, detecting a subject image position of a target subject image showing a target subject in the captured image obtained by capturing an imaging region including the target subject by the imaging apparatus, and performing a registration control of setting the detected subject image position to a specific position in the captured image by increasing a ratio of application of the image region movement portion compared to the lens moving mechanism in a case where the acquired focal length is greater than or equal to a threshold value, and increasing a ratio of application of the lens moving mechanism compared to the image region movement portion in a case where the focal length is less than the threshold value.

BRIEF DESCRIPTION OF THE DRAWINGS

Exemplary embodiments of the technology of the disclosure will be described in detail based on the following figures, wherein:

FIG. 10A is a flowchart illustrating an example of a flow of registration control processing according to the first embodiment;

FIG. 11A is a conceptual diagram illustrating an example of an aspect in which a target subject is present in a center portion of an imaging region according to the first embodiment;

FIG. 12A is a conceptual diagram illustrating an example of an aspect in which the target subject is present in an end portion of the imaging region according to the first embodiment;

FIG. 13A is a conceptual diagram illustrating an example of an aspect in which the target subject image deviates from the imaging region in accordance with increasing of a focal length of the surveillance camera according to the first embodiment;

DETAILED DESCRIPTION

An example of an embodiment according to the disclosed technology will be described in accordance with the appended drawings.

First, words used in the following description will be described.

CPU is an abbreviation for "Central Processing Unit". RAM is an abbreviation for "Random Access Memory". ROM is an abbreviation for "Read Only Memory". ASIC is an abbreviation for "Application Specific Integrated Circuit". PLD is an abbreviation for "Programmable Logic Device". FPGA is an abbreviation for "Field-Programmable Gate Array". AFE is an abbreviation for "Analog Front End". DSP is an abbreviation for "Digital Signal Processor". ISP is an abbreviation for "Image Signal Processor". SoC is an abbreviation for "System-on-a-chip". CMOS is an abbreviation for "Complementary Metal Oxide Semiconductor". CCD is an abbreviation for "Charge Coupled Device". SWIR is an abbreviation for "Short-Wavelength Infrared".

SSD is an abbreviation for "Solid State Drive". USB is an abbreviation for "Universal Serial Bus". HDD is an abbreviation for "Hard Disk Drive". EEPROM is an abbreviation for "Electrically Erasable and Programmable Read Only Memory". EL is an abbreviation for "Electro-Luminescence". A/D is an abbreviation for "Analog/Digital". OF is an abbreviation for "Interface". UI is an abbreviation for "User Interface". WAN is an abbreviation for "Wide Area Network". CRT is an abbreviation for "Cathode Ray Tube". OIS is an abbreviation for "Optical Image Stabilizer". BIS is an abbreviation for "Body Image Stabilizer".

In the description of the present specification, "horizontal" refers to being horizontal in a sense of not only being completely horizontal but also including an error generally allowed in the technical field to which the disclosed technology belongs. In the description of the present specification, "parallel" refers to being parallel in a sense of not only being completely parallel but also including an error generally allowed in the technical field to which the disclosed technology belongs. In the description of the present specification, "perpendicular" refers to being perpendicular in a sense of not only being completely perpendicular but also including an error generally allowed in the technical field to which the disclosed technology belongs. In the description of the present specification, "same" refers to being the same in a sense of not only being completely the same but also including an error generally allowed in the technical field to which the disclosed technology belongs.

First Embodiment

Figure 1:
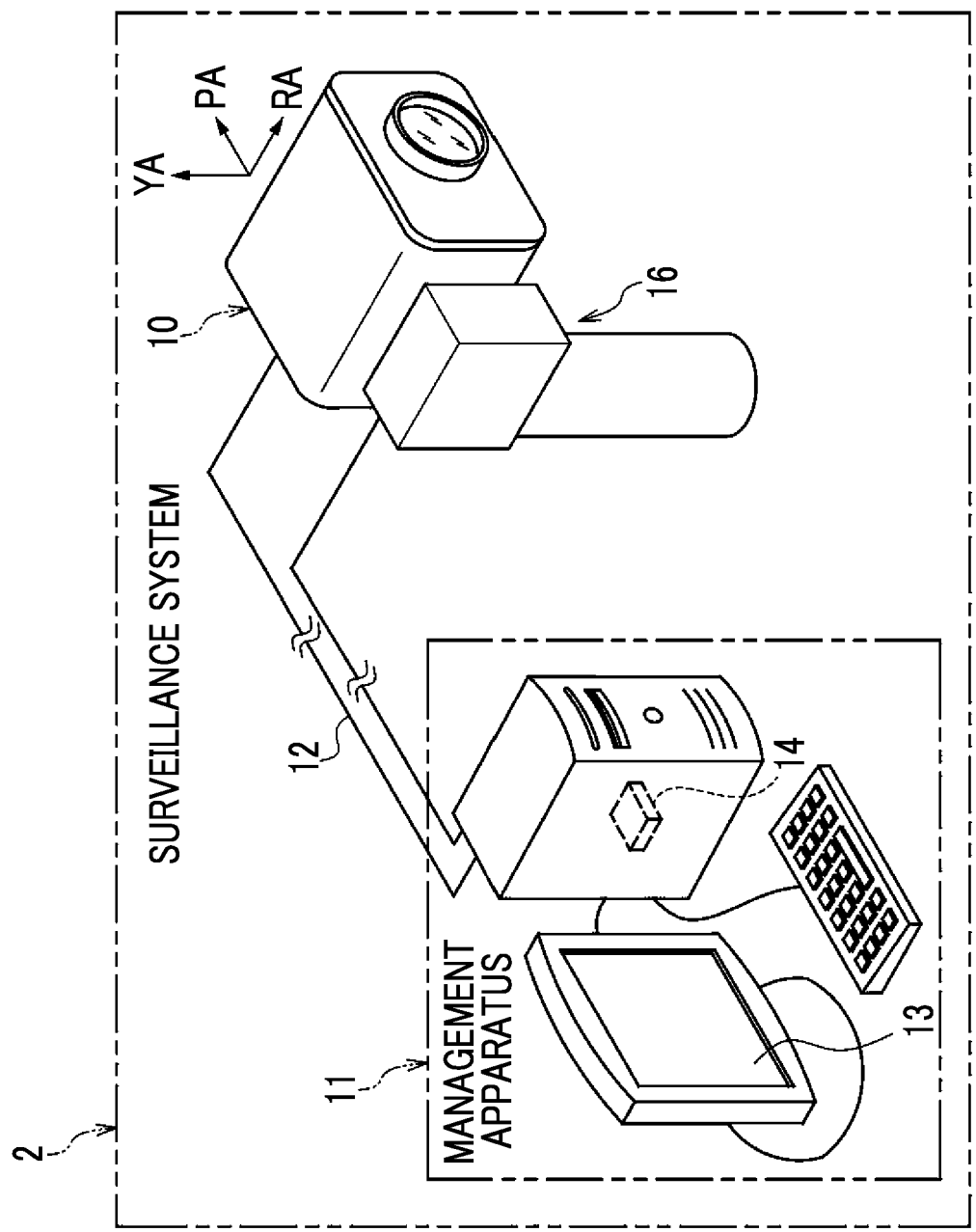
FIG. 1 is a schematic configuration diagram illustrating an example of a configuration of a surveillance system according to a first embodiment.

As illustrated in FIG. 1 as an example, a surveillance system 2 comprises a surveillance camera 10, a revolution mechanism 16, and a management apparatus 11. The surveillance system 2 is an example of an "imaging system" or an "imaging support system" according to the embodiment of the disclosed technology. The surveillance camera 10 is an example of an "imaging apparatus" according to the embodiment of the disclosed technology.

The surveillance camera 10 is installed in an indoor or outdoor post or wall, a part (for example, a rooftop) of a building, or the like through a revolution mechanism 16, described later, images a surveillance target (hereinafter, referred to as an "imaging region") that is a subject, and generates a motion picture image by the imaging. The motion picture image includes images of a plurality of frames obtained by imaging. The surveillance camera 10 transmits the motion picture image obtained by imaging to the management apparatus 11 through a communication line 12.

The management apparatus 11 comprises a display 13 and a secondary storage device 14. Examples of the display 13 include a liquid crystal display, a plasma display, an organic EL display, and a CRT display.

Examples of the secondary storage device 14 include an HDD. The secondary storage device 14 may be a non-volatile memory such as a flash memory, an SSD, or an EEPROM instead of the HDD.

In the management apparatus 11, the motion picture image transmitted by the surveillance camera 10 is received, and the received motion picture image is displayed on the display 13 or stored in the secondary storage device 14.

Figure 2:
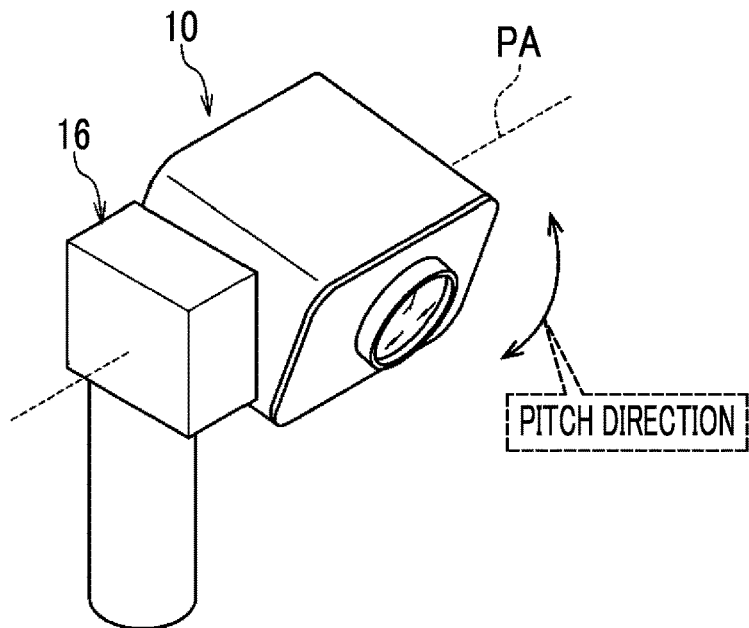
FIG. 2 is a perspective view illustrating an example of an exterior of a surveillance camera in a state where the surveillance camera revolves in a pitch direction according to the first embodiment.
Figure 3:
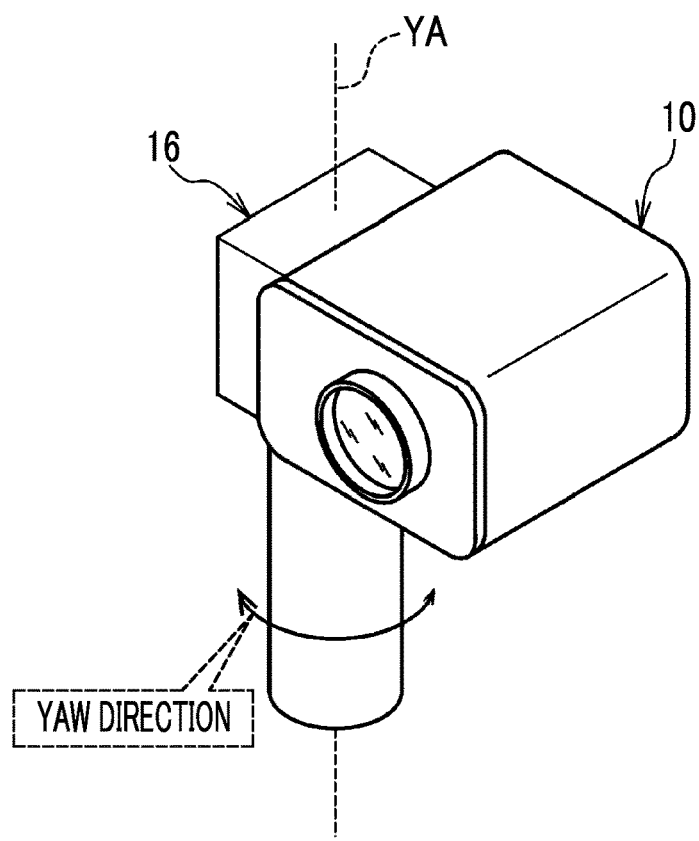
FIG. 3 is a perspective view illustrating an example of the exterior of the surveillance camera in a state where the surveillance camera revolves in a yaw direction according to the first embodiment.

The surveillance camera 10 is attached to the revolution mechanism 16. The revolution mechanism 16 enables the surveillance camera 10 to revolve. Specifically, the revolution mechanism 16 is a 2-axis revolution mechanism that enables the surveillance camera 10 to revolve in a revolution direction (hereinafter, referred to as a "pitch direction") that intersects with a yaw direction and is about a pitch axis PA as a central axis as illustrated in FIG. 2 as an example, and a revolution direction (hereinafter, referred to as the "yaw direction") about a yaw axis YA as a central axis as illustrated in FIG. 3 as an example. The revolution mechanism 16 is an example of a "revolution mechanism" according to the embodiment of the disclosed technology. While an example of the 2-axis revolution mechanism is illustrated for the revolution mechanism 16 according to the present embodiment, the disclosed technology is not limited thereto, and a 3-axis revolution mechanism may be used.

Figure 4:
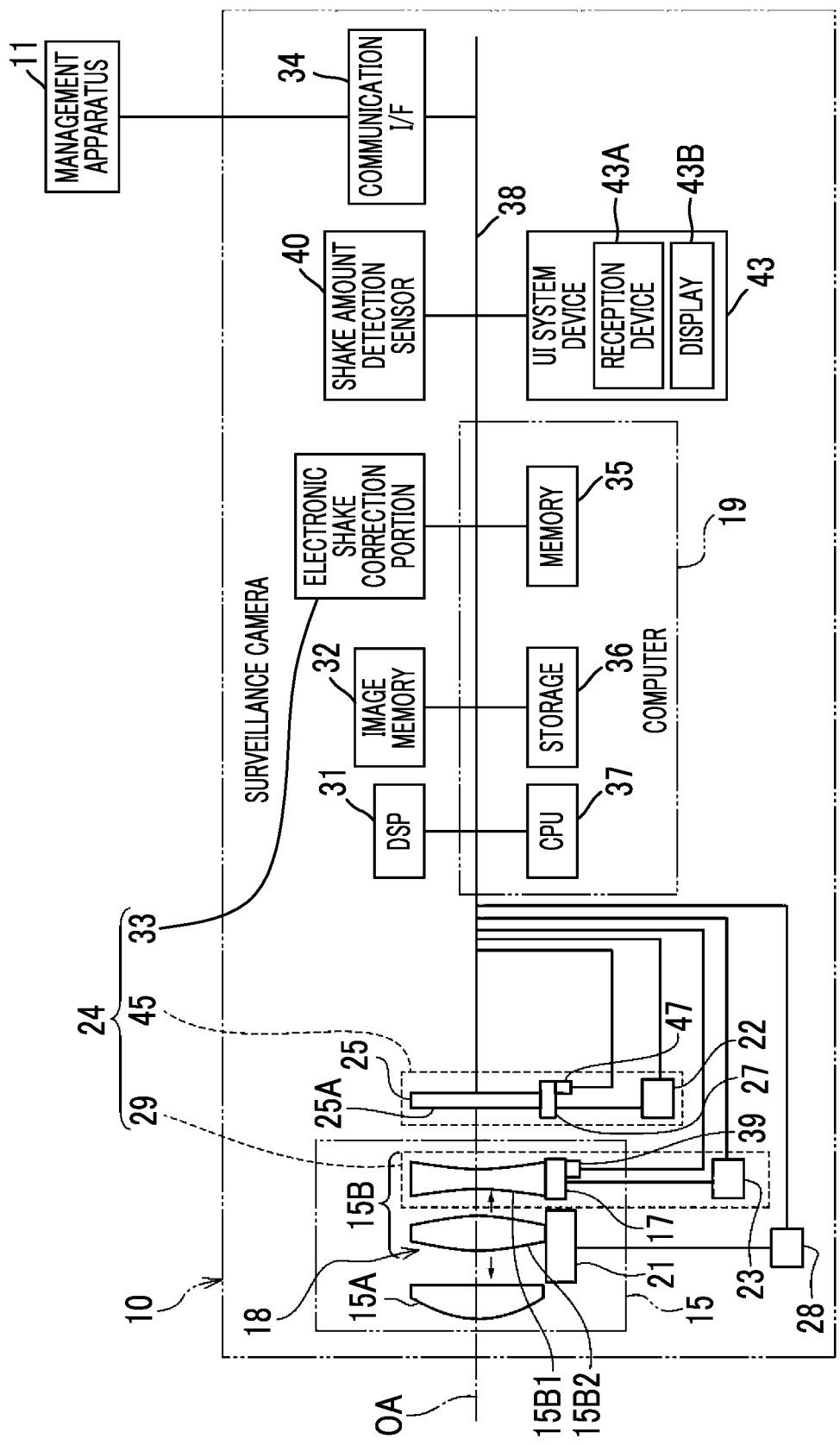
FIG. 4 is a block diagram illustrating an example of a configuration of an optical system and an electric system of the surveillance camera according to the first embodiment.

As illustrated in FIG. 4 as an example, the surveillance camera 10 comprises an optical system 15 and an imaging element 25. The imaging element 25 is positioned on a rear stage of the optical system 15. The imaging element 25 comprises a light-receiving surface 25A. An image of light showing the imaging region is formed on the light-receiving surface 25A of the imaging element 25 by the optical system 15, and the imaging region is captured by the imaging element 25.

The surveillance camera 10 comprises a computer 19, a displacement driver 22, a displacement driver 23, a zoom driver 28, a DSP 31, an image memory 32, an electronic shake correction portion 33, a communication OF 34, position detection sensors 39 and 47, a shake amount detection sensor 40, and a UI system device 43. The computer 19 comprises a memory 35, a storage 36, and a CPU 37. The computer 19 is an example of a "computer" according to the embodiment of the disclosed technology. In addition, the electronic shake correction portion 33 and the CPU 37 are an example of an "electronic shake correction portion (electronic shake correction component)" according to the embodiment of the disclosed technology.

The displacement driver 22, the displacement driver 23, the imaging element 25, the zoom driver 28, the DSP 31, the image memory 32, the electronic shake correction portion 33, the communication OF 34, the memory 35, the storage 36, the CPU 37, the position detection sensors 39 and 47, the shake amount detection sensor 40, and the UI system device 43 are connected to a bus 38. In the example illustrated in FIG. 4, while one bus is illustrated as the bus 38 for convenience of illustration, a plurality of buses may be used. The bus 38 may be a serial bus or may be a parallel bus including a data bus, an address bus, a control bus, and the like.

The memory 35 temporarily stores various information and is used as a work memory. Examples of the memory 35 include a RAM. However, the disclosed technology is not limited thereto. A storage device of other types may be used. The storage 36 stores various programs for the surveillance camera 10. The CPU 37 controls the entire surveillance camera 10 by reading out various programs from the storage 36 and executing the read various programs on the memory 35. Examples of the storage 36 include a flash memory, an SSD, an EEPROM, or an HDD. In addition, for example, various non-volatile memories such as a magnetoresistive memory and a ferroelectric memory may be used instead of the flash memory or together with the flash memory.

The imaging element 25 is a CMOS image sensor. The imaging element 25 images the target subject at a predetermined frame rate under an instruction of the CPU 37. Here, for example, the "predetermined frame rate" refers to a few tens of frames/second to a few hundred frames/second. The imaging element 25 may incorporate a control device (imaging element control device). In this case, the imaging element control device performs detailed controls inside imaging element 25 in accordance with an imaging instruction output by the CPU 37. In addition, the imaging element 25 may image a target subject at the predetermined frame rate under an instruction of the DSP 31. In this case, the imaging element control device performs the detailed controls inside the imaging element 25 in accordance with the imaging instruction output by the DSP 31. The DSP 31 may be referred to as an ISP.

The light-receiving surface 25A of the imaging element 25 is formed with a plurality of photosensitive pixels (not illustrated) arranged in a matrix. In the imaging element 25, photoelectric conversion is performed for each photosensitive pixel by exposing each photosensitive pixel. Charges obtained by performing the photoelectric conversion for each photosensitive pixel correspond to an analog imaging signal indicating the target subject. Here, a plurality of photoelectric conversion elements (for example, photoelectric conversion elements in which color filters are arranged) having sensitivity to visible light are employed as the plurality of photosensitive pixels. In the imaging element 25, a photoelectric conversion element having sensitivity to light of red (R) (for example, a photoelectric conversion element in which an R filter corresponding to R is arranged), a photoelectric conversion element having sensitivity to light of green (G) (for example, a photoelectric conversion element in which a G filter corresponding to G is arranged), and a photoelectric conversion element having sensitivity to light of blue (B) (for example, a photoelectric conversion element in which a B filter corresponding to B is arranged) are employed as the plurality of photoelectric conversion elements. In the surveillance camera 10, imaging based on the visible light (for example, light on a short wavelength side of less than or equal to approximately 700 nanometers) is performed using these photosensitive pixels. However, the present embodiment is not limited thereto. Imaging based on infrared light (for example, light on a long wavelength side of greater than approximately 700 nanometers) may be performed. In this case, a plurality of photoelectric conversion elements having sensitivity to the infrared light may be used as the plurality of photosensitive pixels. Particularly, for example, an InGaAs sensor and/or a type-2 quantum well (T2SL; Simulation of Type-II Quantum Well) sensor may be used for imaging for SWIR.

The imaging element 25 generates a digital image that is a digital imaging signal by performing signal processing such as A/D conversion on the analog imaging signal. The imaging element 25 is connected to the DSP 31 through the bus 38 and outputs the generated digital image to the DSP 31 in units of frames through the bus 38. Here, the digital image is an example of a "captured image" according to the embodiment of the disclosed technology.

Here, while the CMOS image sensor is illustratively described as an example of the imaging element 25, the disclosed technology is not limited thereto. A CCD image sensor may be applied as the imaging element 25. In this case, the imaging element 25 is connected to the bus 38 through an AFE (not illustrated) that incorporates a CCD driver. The AFE generates the digital image by performing the signal processing such as the A/D conversion on the analog imaging signal obtained by the imaging element 25 and outputs the generated digital image to the DSP 31. The CCD image sensor is driven by the CCD driver incorporated in the AFE. The CCD driver may be independently provided.

The DSP 31 performs various digital signal processing on the digital image. For example, the various digital signal processing refers to demosaicing, noise removal processing, gradation correction processing, and color correction processing.

The DSP 31 outputs the digital image after the digital signal processing to the image memory 32 for each frame. The image memory 32 stores the digital image from the DSP 31. Hereinafter, for convenience of description, the digital image stored in the image memory 32 will be referred to as the "captured image".

The shake amount detection sensor 40 is, for example, a device including a gyro sensor and detects the shake amount of the surveillance camera 10. In other words, the shake amount detection sensor 40 detects the shake amount for each of a pair of axial directions. The gyro sensor detects an amount of a rotational shake about each axis (refer to FIG. 1) of the pitch axis PA, the yaw axis YA, and a roll axis RA (axis parallel to the optical axis OA). The shake amount detection sensor 40 detects the shake amount of the surveillance camera 10 by converting the amount of the rotational shake about the pitch axis PA and the amount of the rotational shake about the yaw axis YA detected by the gyro sensor into a shake amount in a two-dimensional plane parallel to the pitch axis PA and the yaw axis YA.

Here, while the gyro sensor is illustrated as an example of the shake amount detection sensor 40, this is merely an example. The shake amount detection sensor 40 may be an acceleration sensor. The acceleration sensor detects the shake amount in the two-dimensional plane parallel to the pitch axis PA and the yaw axis YA. The shake amount detection sensor 40 outputs the detected shake amount to the CPU 37.

In addition, here, while an example of a form of detecting the shake amount by the shake amount detection sensor 40 that is a physical sensor is illustrated, the disclosed technology is not limited thereto. For example, a movement vector obtained by comparing captured images that are stored in the image memory 32 and are adjacent to each other in time series may be used as the shake amount. In addition, a finally used shake amount may be derived based on the shake amount detected by the physical sensor and the movement vector obtained by the image processing.

The CPU 37 acquires the shake amount detected by the shake amount detection sensor 40 and controls the lens side shake correction mechanism 29, the imaging element side shake correction mechanism 45, and the electronic shake correction portion 33 based on the acquired shake amount. The shake amount detected by the shake amount detection sensor 40 is used for correction of the shake by each of the lens side shake correction mechanism 29 and the electronic shake correction portion 33.

The electronic shake correction portion 33 is a device including an ASIC. The electronic shake correction portion 33 corrects the shake by performing the image processing on the captured image obtained by imaging performed by the imaging element 25 in the image memory 32 based on the shake amount detected by the shake amount detection sensor 40. Here, while an example of a form of correcting the shake by the electronic shake correction portion 33 based on the shake amount detected by the shake amount detection sensor 40 is illustrated, the disclosed technology is not limited thereto. For example, the shake may be corrected by the electronic shake correction portion 33 in accordance with a movement vector calculated based on a difference between the frames of the captured image.

In addition, here, while the device including the ASIC is illustrated as the electronic shake correction portion 33, the disclosed technology is not limited thereto. For example, a device including an FPGA or a PLD may be used. In addition, for example, the electronic shake correction portion 33 may be a device including a plurality out of the ASIC, the FPGA, and the PLD. In addition, a computer including a CPU, a storage, and a memory may be employed as the electronic shake correction portion 33. The number of CPUs may be singular or plural. In addition, the electronic shake correction portion 33 may be implemented by a combination of a hardware configuration and a software configuration.

The communication OF 34 is, for example, a network interface and controls transfer of various information with respect to the management apparatus 11 through a network. Examples of the network include a WAN such as the Internet or a public communication network. Communication between the surveillance camera 10 and the management apparatus 11 is controlled.

The UI system device 43 comprises a reception device 43A and a display 43B. The reception device 43A includes, for example, a hard key and a touch panel and receives various instructions from the user. The CPU 37 acquires the various instructions received by the reception device 43A and operates in accordance with the acquired instructions.

The display 43B displays various information under control of the CPU 37. Examples of the various information displayed on the display 43B include contents of the various instructions received by the reception device 43A and the captured image.

The optical system 15 comprises an objective lens 15A and a lens group 15B. The objective lens 15A and the lens group 15B are arranged in an order of the objective lens 15A and the lens group 15B along the optical axis OA of the optical system 15 from the target subject side to the light-receiving surface 25A side of the imaging element 25. The lens group 15B includes an anti-vibration lens 15B1, a focus lens (not illustrated), a zoom lens 15B2, and the like. Various lenses (not illustrated) may be comprised as the optical system 15 in addition to the objective lens 15A and the lens group 15B. Furthermore, the optical system 15 may comprise a stop. Positions of the lenses, the lens group, and the stop included in the optical system 15 are not limited. For example, the disclosed technology is also established for positions different from the positions illustrated in FIG. 4.

The surveillance camera 10 comprises actuators 17 and 21 and an actuator 27. The zoom lens 15B2 is movably supported along the optical axis OA by the actuator 21, described later. The anti-vibration lens 15B1 is movably supported in a direction perpendicular to the optical axis OA by the actuator 17. The imaging element 25 is movably supported in the direction perpendicular to the optical axis OA by the actuator 27.

The actuator 17 applies motive power to the anti-vibration lens 15B1 to change in a direction perpendicular to an optical axis of the anti-vibration lens 15B1. The actuator 17 is controlled by the CPU 37 through the displacement driver 23. The displacement driver 23 changes the position of the anti-vibration lens 15B1 in the direction perpendicular to the optical axis OA by operating the actuator 17 in accordance with an instruction from the CPU 37.

The actuator 21 applies motive power to the zoom lens 15B2 to move along the optical axis OA of the optical system 15. The actuator 21 is controlled by the CPU 37 through the zoom driver 28. The zoom driver 28 moves the position of the zoom lens 15B2 along the optical axis OA by operating the actuator 21 in accordance with the instruction from the CPU 37.

The actuator 27 applies motive power to the imaging element 25 to change the imaging element 25 in the direction perpendicular to the optical axis of the anti-vibration lens 15B1. The actuator 27 is controlled by the CPU 37 through the displacement driver 22. The displacement driver 22 changes a position of the imaging element 25 in the direction perpendicular to the optical axis OA by operating the actuator 27 in accordance with the instruction from the CPU 37.

The surveillance camera 10 includes a variable magnification mechanism 18. The variable magnification mechanism 18 is a mechanism that comprises the zoom lens 15B2, the actuator 21, and the zoom driver 28 and can change a focal length. The CPU 37 changes the focal length by operating the actuator 21 through the zoom driver 28. In the surveillance camera 10, increasing the focal length from the current focal length positions the zoom lens 15B2 on a telephoto side from the current position. Thus, an angle of view is narrowed. Narrowing of the angle of view means narrowing of an imaging range. In addition, in the surveillance camera 10, decreasing the focal length from the current focal length positions the zoom lens 15B2 on a wide angle side from the current position. Thus, the angle of view is widened. Widening of the angle of view means widening of an imaging range. The diagram of the variable magnification mechanism 18 illustrated in the embodiment of the disclosed technology is merely a conceptual diagram. The variable magnification mechanism 18 may employ various configurations.

Examples of a vibration exerted on the surveillance camera 10 include, in a case of an outdoor space, a vibration caused by traffic of an automobile, a vibration caused by wind, a vibration caused by construction work, and the like and, in a case of an indoor space, a vibration caused by an operation of an air conditioner, a vibration caused by entrance and exit of a person, and the like. Thus, in the surveillance camera 10, a shake occurs due to the vibration exerted on the surveillance camera 10 (hereinafter, simply referred to as the "vibration"). Hereinafter, the shake that occurs due to the vibration will be simply referred to as the "shake".

In the present embodiment, the "shake" refers to a phenomenon in which a subject image on the light-receiving surface 25A of the imaging element 25 changes due to a change in positional relationship between the optical axis OA and the light-receiving surface 25A in the surveillance camera 10. In other words, the "shake" is said to be a phenomenon in which an optical image obtained by forming the image on the light-receiving surface 25A changes by inclination of the optical axis OA due to the vibration exerted on the surveillance camera 10. For example, changing of the optical axis OA means inclination of the optical axis OA with respect to a reference axis (for example, the optical axis OA before the shake occurs).

The shake is included in the captured image as a noise component and affects image quality of the captured image. Therefore, in order to remove the noise component included in the captured image due to the shake, the surveillance camera 10 comprises a shake correction portion 24. The shake correction portion 24 is an example of a "registration portion (registration component)" according to the embodiment of the disclosed technology. The shake correction portion 24 includes the lens side shake correction mechanism 29, the imaging element side shake correction mechanism 45, and the electronic shake correction portion 33. All of the lens side shake correction mechanism 29, the imaging element side shake correction mechanism 45, and the electronic shake correction portion 33 are used for correcting the shake. The lens side shake correction mechanism 29 is a mechanism that corrects the shake by applying motive power generated by a driving source such as a motor (for example, a voice coil motor) to the anti-vibration lens to move the anti-vibration lens in the direction perpendicular to the optical axis of the imaging optical system. The imaging element side shake correction mechanism 45 is a mechanism that corrects the shake by applying motive power generated by a driving source such as a motor (for example, a voice coil motor) to the imaging element to move the imaging element in the direction perpendicular to the optical axis of the imaging optical system. The electronic shake correction portion 33 corrects the shake by performing image processing on a captured image based on a shake amount. That is, the shake correction portion 24 mechanically or electronically corrects the shake using a hardware configuration and/or a software configuration. Here, mechanical correction of the shake refers to correction of the shake implemented by mechanically moving a shake correction element such as an anti-vibration lens and/or an imaging element using motive power generated by a driving source such as a motor (for example, a voice coil motor). Electronic correction of the shake refers to correction of the shake implemented by performing the image processing by a processor. In addition, in the present embodiment, "correction of the shake" includes a meaning of removing the shake and also a meaning of reducing the shake. The lens side shake correction mechanism 29 is a mechanism that moves the anti-vibration lens 15B1 in the direction perpendicular to the optical axis OA, and is an example of a "lens moving mechanism" according to the embodiment of the disclosed technology. The imaging element side shake correction mechanism 45 and the electronic shake correction portion 33 are mechanisms that move the region of the captured image in the imaging element 25 in the direction perpendicular to the optical axis OA. The imaging element side shake correction mechanism 45 and the electronic shake correction portion 33 are an example of an "image region movement portion (image region movement component)" and an "imaging element side shake correction portion (imaging element side shake correction component)" according to the embodiment of the disclosed technology.

As illustrated in FIG. 4 as an example, the lens side shake correction mechanism 29 comprises the anti-vibration lens 15B1, the actuator 17, the displacement driver 23, and the position detection sensor 39.

Various well-known methods can be employed as a method of correcting the shake by the lens side shake correction mechanism 29. In the present embodiment, a method of correcting the shake by moving the anti-vibration lens 15B1 based on the shake amount detected by the shake amount detection sensor 40 is employed as the method of correcting the shake. Specifically, the shake is corrected by moving the anti-vibration lens 15B1 in a direction of canceling the shake by an amount with which the shake is canceled.

The actuator 17 is attached to the anti-vibration lens 15B1. The actuator 17 is a shift mechanism in which a voice coil motor is mounted, and changes the anti-vibration lens 15B1 in the direction perpendicular to the optical axis of the anti-vibration lens 15B1 by driving the voice coil motor. Here, while the shift mechanism in which the voice coil motor is mounted is employed as the actuator 17, the disclosed technology is not limited thereto. Other motive power sources such as a stepping motor or a piezo element may be applied instead of the voice coil motor.

The actuator 17 is controlled by the displacement driver 23. Driving the actuator 17 under control of the displacement driver 23 mechanically changes the position of the anti-vibration lens 15B1 in a two-dimensional plane perpendicular to the optical axis OA.

The position detection sensor 39 detects the current position of the anti-vibration lens 15B1 and outputs a position signal indicating the detected current position. Here, a device including a hall element is employed as an example of the position detection sensor 39. Here, the current position of the anti-vibration lens 15B1 refers to the current position in a two-dimensional plane of the anti-vibration lens. The two-dimensional plane of the anti-vibration lens refers to a two-dimensional plane perpendicular to the optical axis of the anti-vibration lens 15B1. In the present embodiment, while the device including the hall element is employed as an example of the position detection sensor 39, the disclosed technology is not limited thereto. A magnetic sensor, a photosensor, or the like may be employed instead of the hall element.

The lens side shake correction mechanism 29 corrects the shake by moving the anti-vibration lens 15B1 along at least one of a direction of the pitch axis PA or a direction of the yaw axis YA. That is, the lens side shake correction mechanism 29 corrects the shake by moving the anti-vibration lens 15B1 by a movement amount corresponding to the shake amount detected by the shake amount detection sensor 40 in the two-dimensional plane of the anti-vibration lens.

The imaging element side shake correction mechanism 45 comprises the imaging element 25, the displacement driver 22, the actuator 27, and a position detection sensor 47. In the same manner as the method of correcting the shake by the lens side shake correction mechanism 29, various well-known methods can be employed as a method of correcting the shake by the imaging element side shake correction mechanism 45. In the present embodiment, a method of correcting the shake by moving the imaging element 25 by the displacement driver 22 through the actuator 27 in accordance with the instruction from the CPU 37 based on the shake amount detected by the shake amount detection sensor 40 is employed as the method of correcting the shake. Specifically, the shake is corrected by moving the imaging element 25 in the direction of canceling the shake by the amount with which the shake is canceled.

The actuator 27 is a shift mechanism in which a voice coil motor is mounted, and changes the imaging element 25 in the direction perpendicular to the optical axis of the anti-vibration lens 15B1 by driving the voice coil motor. Here, while the shift mechanism in which the voice coil motor is mounted is employed as the actuator 27, the disclosed technology is not limited thereto. Other motive power sources such as a stepping motor or a piezo element may be applied instead of the voice coil motor.

The position detection sensor 47 detects the current position of the imaging element 25 and outputs a position signal indicating the detected current position. Here, a device including a hall element is employed as an example of the position detection sensor 47. Here, the current position of the imaging element 25 refers to the current position in a two-dimensional plane of the imaging element. The two-dimensional plane of the imaging element refers to a two-dimensional plane perpendicular to the optical axis of the anti-vibration lens 15B1. In the present embodiment, while the device including the hall element is employed as an example of the position detection sensor 47, the disclosed technology is not limited thereto. A magnetic sensor, a photosensor, or the like may be employed instead of the hall element.

Figure 5:
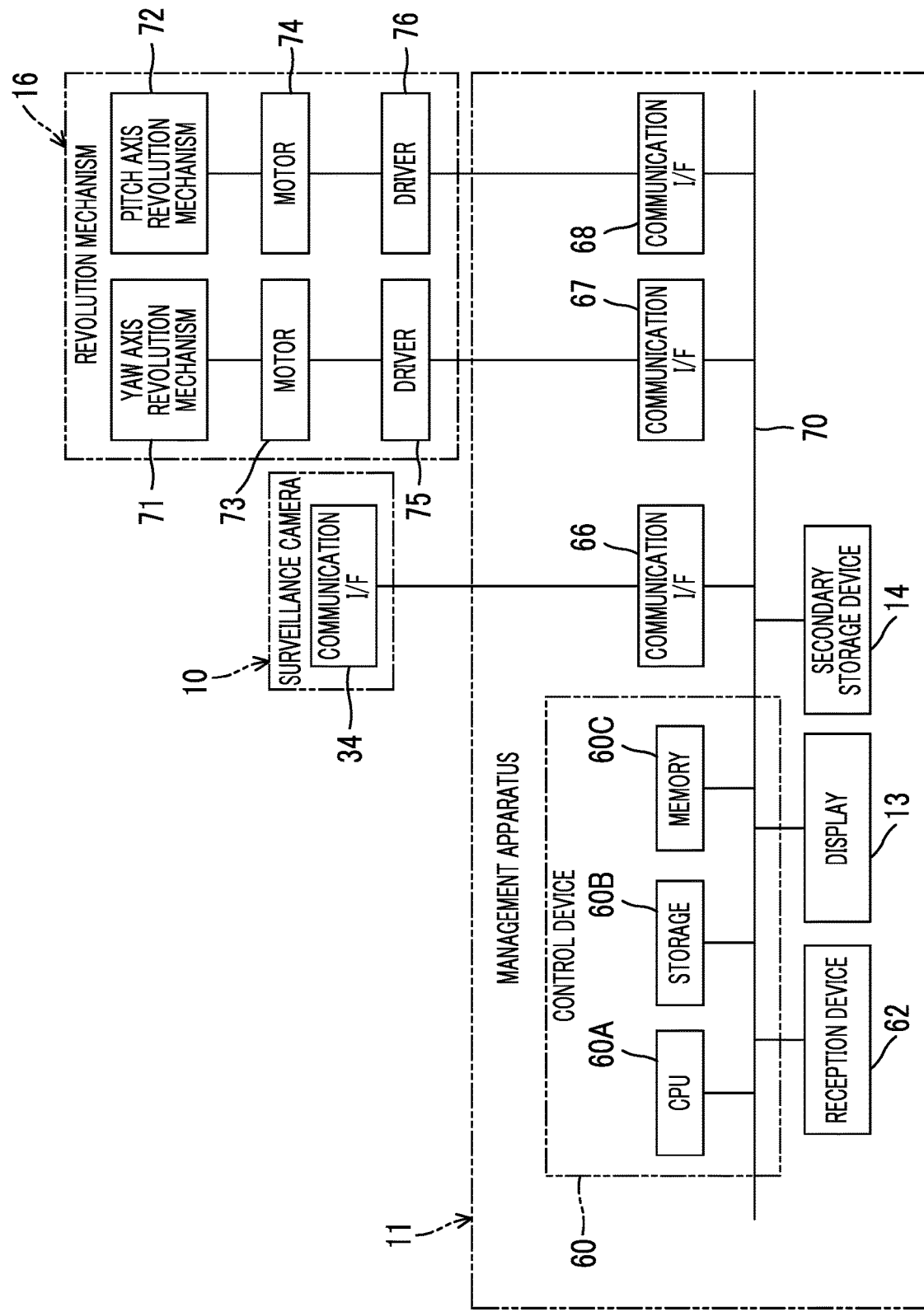
FIG. 5 is a block diagram illustrating an example of a configuration of an electric system of a management apparatus and a revolution mechanism according to the first embodiment.

As illustrated in FIG. 5 as an example, the management apparatus 11 comprises the display 13, a control device 60, a reception device 62, and a communication I/F 66. In addition, the revolution mechanism 16 comprises a yaw axis revolution mechanism 71, a pitch axis revolution mechanism 72, a motor 73, a motor 74, a driver 75, and a driver 76.

The control device 60 comprises a CPU 60A, a storage 60B, and a memory 60C. Each of the reception device 62, the display 13, the secondary storage device 14, the CPU 60A, the storage 60B, the memory 60C, and the communication I/F 66 is connected to a bus 70. In the example illustrated in FIG. 5, while one bus is illustrated as the bus 70 for convenience of illustration, a plurality of buses may be used. The bus 70 may be a serial bus or may be a parallel bus including a data bus, an address bus, a control bus, and the like.

The memory 60C temporarily stores various information and is used as a work memory. Examples of the memory 60C include a RAM. However, the disclosed technology is not limited thereto. A storage device of other types may be used. The storage 60B stores various programs for the management apparatus 11 (hereinafter, simply referred to as a "management apparatus program"). The CPU 60A controls the entire management apparatus 11 by reading out the management apparatus program from the storage 60B and executing the read management apparatus program on the memory 60C.

The communication OF 66 is, for example, a network interface. The communication I/F 66 is communicably connected to the communication OF 34 of the surveillance camera 10 through a network and controls transfer of various information with respect to the surveillance camera 10. For example, the communication OF 66 requests the surveillance camera 10 to transmit the captured image and receives the captured image transmitted from the communication OF 34 of the surveillance camera 10 in response to the request for transmission of the captured image.

Communication I/Fs 67 and 68 are, for example, network interfaces. The communication OF 67 is communicably connected to the driver 75 of the revolution mechanism 16 through a network. The CPU 60A controls a revolution operation of the yaw axis revolution mechanism 71 by controlling the motor 73 through the communication OF 67 and the driver 75. The communication OF 68 is communicably connected to the driver 76 of the revolution mechanism 16 through a network. The CPU 60A controls a revolution operation of the pitch axis revolution mechanism 72 by controlling the motor 74 through the communication OF 68 and the driver 76.

The reception device 62 includes, for example, a keyboard, a mouse, and a touch panel and receives various instructions from the user. The CPU 60A acquires the various instructions received by the reception device 62 and operates in accordance with the acquired instructions. For example, in a case where a processing content for the surveillance camera 10 and/or the revolution mechanism 16 is received by the reception device 62, the CPU 60A operates the surveillance camera 10 and/or the revolution mechanism 16 in accordance with an instruction content received by the reception device 62.

The display 13 displays various information under control of the CPU 60A. Examples of the various information displayed on the display 13 include contents of the various instructions received by the reception device 62 and the captured image received by the communication OF 66.

The management apparatus 11 comprises the secondary storage device 14. For example, the secondary storage device 14 is a non-volatile memory and stores various information under control of the CPU 60A. Examples of the various information stored in the secondary storage device 14 include the captured image received by the communication OF 66.

In such a manner, the control device 60 performs a control of displaying the captured image received by the communication OF 66 on the display 13 and a control of storing the captured image received by the communication OF 66 in the secondary storage device 14.

Here, while the control device 60 displays the captured image on the display 13 and stores the captured image received by the communication OF 66 in the secondary storage device 14, the disclosed technology is not limited thereto. For example, any of the display of the captured image on the display 13 and the storage of the captured image in the secondary storage device 14 may be performed.

The motor 73 is driven to generate motive power under control of the driver 75. The yaw axis revolution mechanism 71 causes the surveillance camera 10 to revolve in the yaw direction by receiving the motive power generated by the motor 73. The motor 74 is driven to generate motive power under control of the driver 76. The pitch axis revolution mechanism 72 causes the surveillance camera 10 to revolve in the pitch direction by receiving the motive power generated by the motor 74.

Figure 6:
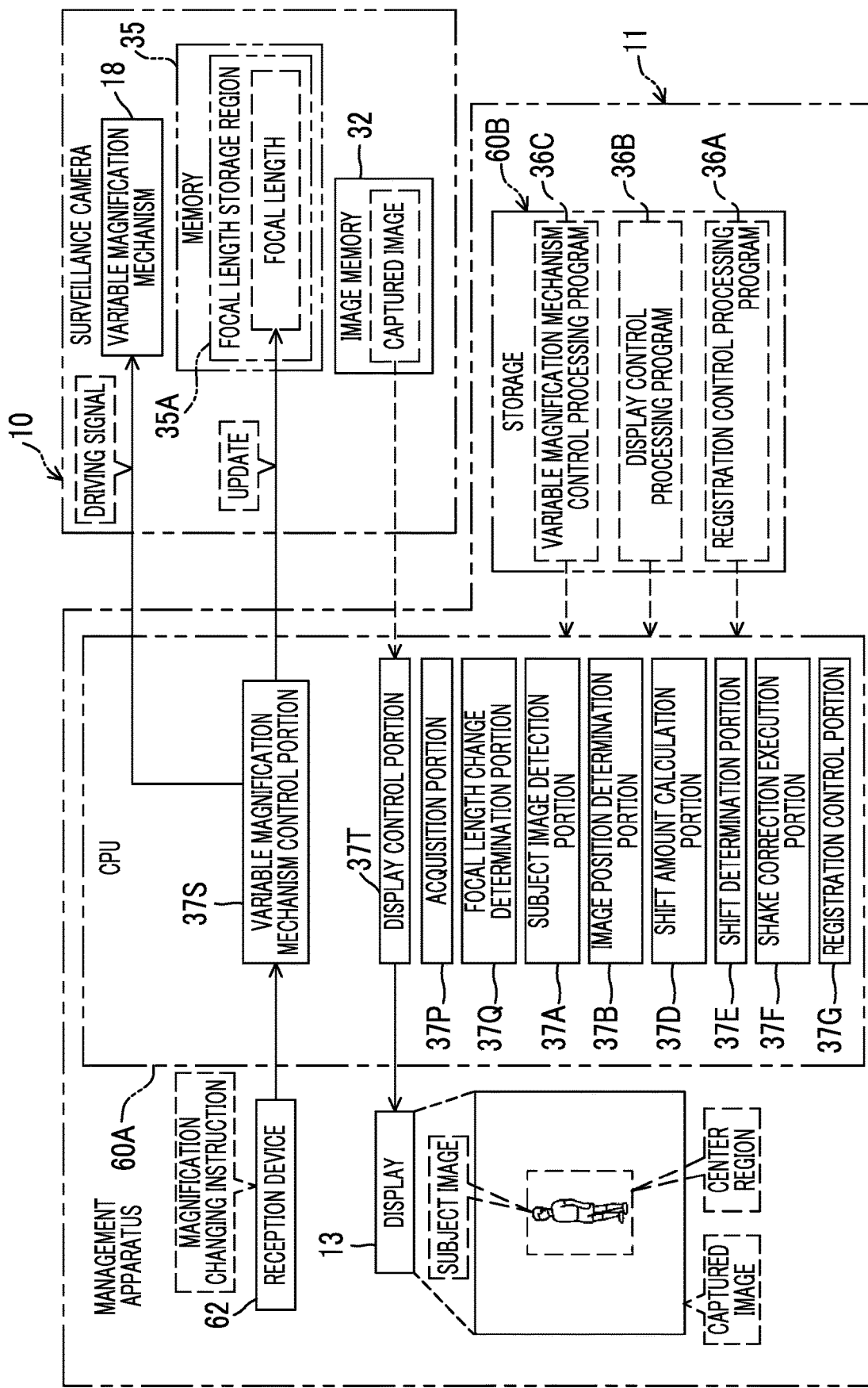
FIG. 6 is a function block diagram illustrating an example of functions of a CPU included in the surveillance camera according to the first embodiment.

As illustrated in FIG. 6 as an example, the storage 60B of the management apparatus 11 stores a registration control processing program 36A, a display control processing program 36B, and a variable magnification mechanism control processing program 36C.

The CPU 60A operates as a variable magnification mechanism control portion 37S by reading out the variable magnification mechanism control processing program 36C from the storage 60B and executing the read variable magnification mechanism control processing program 36C on the memory 60C (refer to FIG. 5).

The reception device 62 receives an instruction (hereinafter, referred to as a "magnification changing instruction") to cause the variable magnification mechanism 18 to change magnification, and the variable magnification mechanism control portion 37S controls the variable magnification mechanism 18 in accordance with the magnification changing instruction received by the reception device 62. Furthermore, the memory 35 of the surveillance camera 10 includes a focal length storage region 35A. The most recent focal length is stored in an overwriting manner in the focal length storage region 35A.

The CPU 60A operates as a display control portion 37T by reading out the display control processing program 36B from the storage 60B and executing the read display control processing program 36B on the memory 60C.

The display control portion 37T reads out the captured image from the image memory 32 of the surveillance camera 10 and displays the read captured image on the display 13 as a live view image. Here, while the live view image is illustrated as the image displayed on the display 13, the disclosed technology is not limited thereto. The image displayed on the display 13 may be a motion picture image for recording or a still picture image for recording.

The CPU 60A is an example of a "processor" according to the embodiment of the disclosed technology. The memory 60C is an example of a "memory" according to the embodiment of the disclosed technology. The CPU 60A reads out the registration control processing program 36A from the storage 60B and executes the read registration control processing program 36A on the memory 60C. Specifically, the CPU 60A operates as an acquisition portion 37P, a focal length change determination portion 37Q, a subject image detection portion 37A, an image position determination portion 37B, a shift amount calculation portion 37D, a shift determination portion 37E, a shake correction execution portion 37F, and a registration control portion 37G. The subject image detection portion 37A and the image position determination portion 37B are an example of a "detection portion" according to the embodiment of the disclosed technology.

Figure 7:
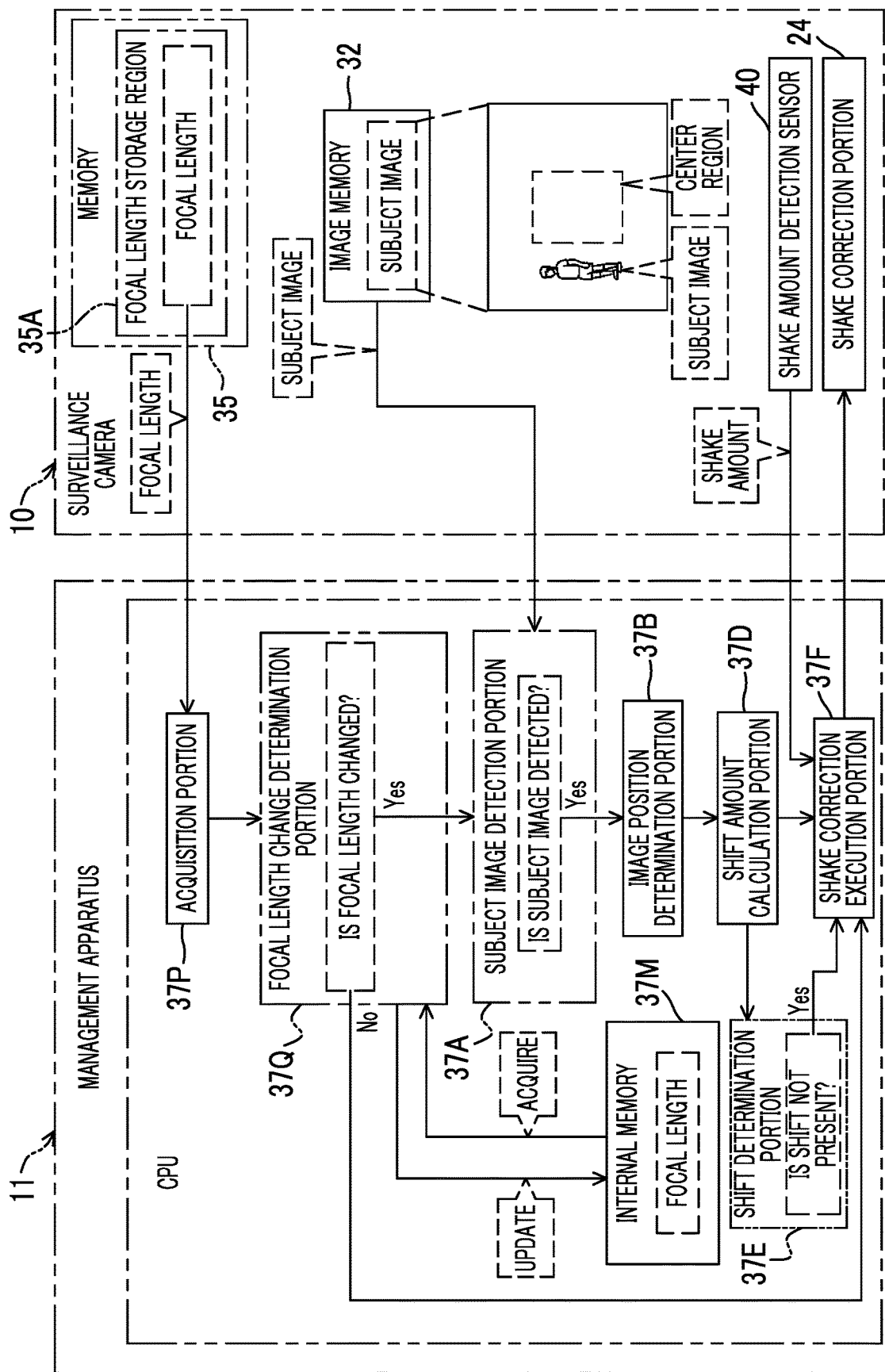
FIG. 7 is a function block diagram illustrating an example of functions of a CPU included in the management apparatus according to the first embodiment.

As illustrated in FIG. 7 as an example, the acquisition portion 37P acquires the focal length from the focal length storage region 35A. Here, in a case where the focal length acquired by the acquisition portion 37P, the angle of view that can be imaged by the surveillance camera 10 is narrowed compared to the focal length before the increase.

The focal length change determination portion 37Q determines whether or not the focal length acquired by the acquisition portion 37P is changed. Specifically, an internal memory 37M of the CPU 60A in the management apparatus 11 stores the focal length (hereinafter, referred to as a "previous focal length") acquired at a previous acquisition timing by the acquisition portion 37P. The focal length change determination portion 37Q compares the previous focal length stored in the internal memory 37M with the focal length (hereinafter, referred to as the "most recent focal length") most recently acquired by the acquisition portion 37P. In a case where the previous focal length and the most recent focal length are different, it is determined that the focal length is changed. In a case where there is no difference, it is determined that the focal length is not changed.

After the determination, the focal length change determination portion 37Q updates a value of the previous focal length in the internal memory 37M by storing a value of the most recent focal length in an overwriting manner in the internal memory 37M. The updated previous focal length is used by the focal length change determination portion 37Q as a comparison target with the most recent focal length in a case where the determination is subsequently performed by the focal length change determination portion 37Q.

The subject image detection portion 37A acquires the captured image of one frame from the image memory 32. Then, the subject image detection portion 37A detects a target subject image in the captured image acquired from the image memory 32. In addition, in a case where the target subject image is detected, the subject image detection portion 37A detects a position of the target subject image (hereinafter, referred to as a "subject image position").

Figure 11B:
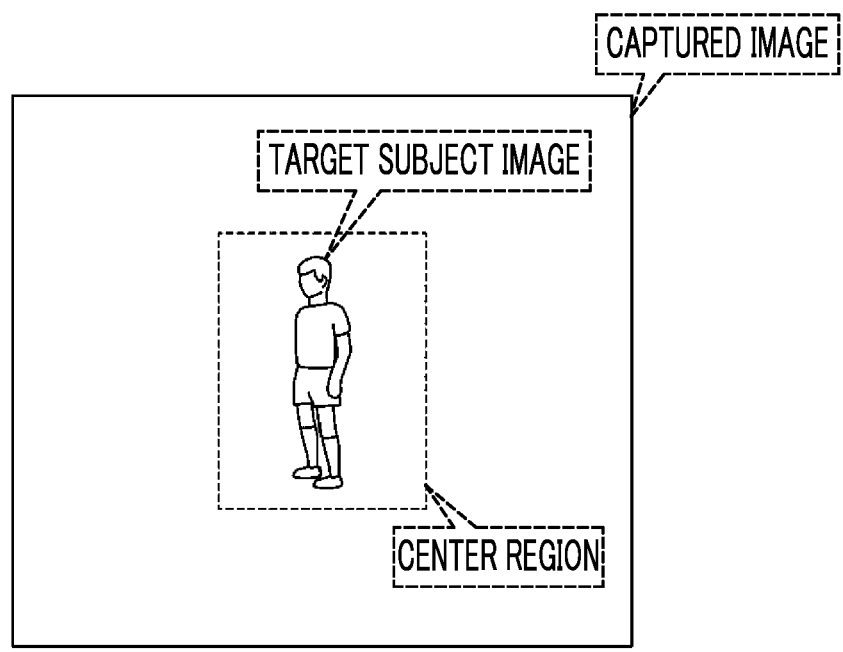
FIG. 11B is a schematic image diagram illustrating an example of a captured image obtained by capturing the imaging region illustrated in FIG. 11A by the surveillance camera.
Figure 12B:
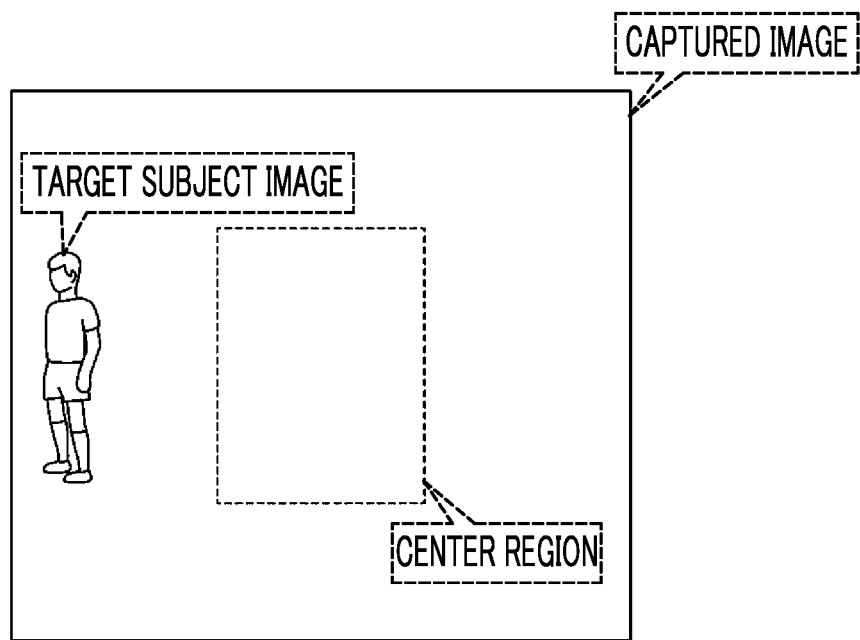
FIG. 12B is a schematic image diagram illustrating an example of the captured image obtained by capturing the imaging region illustrated in FIG. 12A by the surveillance camera.

The image position determination portion 37B determines whether or not the subject image position detected by the subject image detection portion 37A is in a center region in the captured image. As illustrated in FIG. 11A and FIG. 11B as an example, the subject image position may be in the center region in the captured image. Meanwhile, as illustrated in FIG. 12A and FIG. 12B as an example, the target subject may be present in the imaging region but not present in the center region due to revolution of the surveillance camera 10 by the revolution mechanism 16 or movement of the target subject.

In a case where the target subject image is present in the center region, a positive determination is made by the image position determination portion 37B. Here, "present" means an aspect in which at least a part of the target subject image overlaps with the center region. That is, in a case where at least a part of the target subject image overlaps with the center region, a determination "present" is made by the image position determination portion 37B. Examples of at least the part of the target subject image include a specific part in the subject image (for example, in a case where the target subject is a person, a face of the person). An image recognition function (for example, a face recognition function) may be implemented in the surveillance camera 10. In a case where the specific part is recognized in the center region by the image recognition function, the image position determination portion 37B may determine that the target subject image is present in the center region. The center region is an example of a "specific position" according to the embodiment of the disclosed technology.

The shift amount calculation portion 37D calculates a shift amount in a case where the image position determination portion 37B determines that the subject image position is not in a center region CE. The shift amount is an amount indicating shifting, that is, a difference in relative position, of the subject image position with respect to the center region CE and is a vector having two values in the pitch direction and the yaw direction. Examples of the shift amount include a shift amount between a center of the target subject image and a center of the center region CE. As an example, the center of the target subject image can be obtained as two values of a center coordinate in the pitch direction and a center coordinate in the yaw direction of the target subject image.

The shift determination portion 37E determines whether or not the subject image position is shifted from the center region based on the shift amount calculated by the shift amount calculation portion 37D. For example, whether or not the shift is present can be determined by determining whether or not the shift amount calculated by the shift amount calculation portion 37D exceeds a predetermined threshold value. That is, in a case where the shift amount does not exceed the threshold value, it is determined that the shift is not present. Meanwhile, in a case where the shift amount is greater than or equal to the threshold value, it is determined that the shift is present.

The threshold value may be a fixed value that is derived in advance as an upper limit value allowable as the shift amount by a sensory test using an actual apparatus and/or computer simulation or the like. In addition, the threshold value may be a variable value that can be changed in accordance with an instruction received by the reception device 62 or the like, or may be a variable value that can be changed in accordance with an imaging scene or the like.

In a case where the shift determination portion 37E determines that the shifting does not occur, the shake correction execution portion 37F operates the shake correction portion 24 based on the shake amount detected by the shake amount detection sensor 40.

Figure 8:
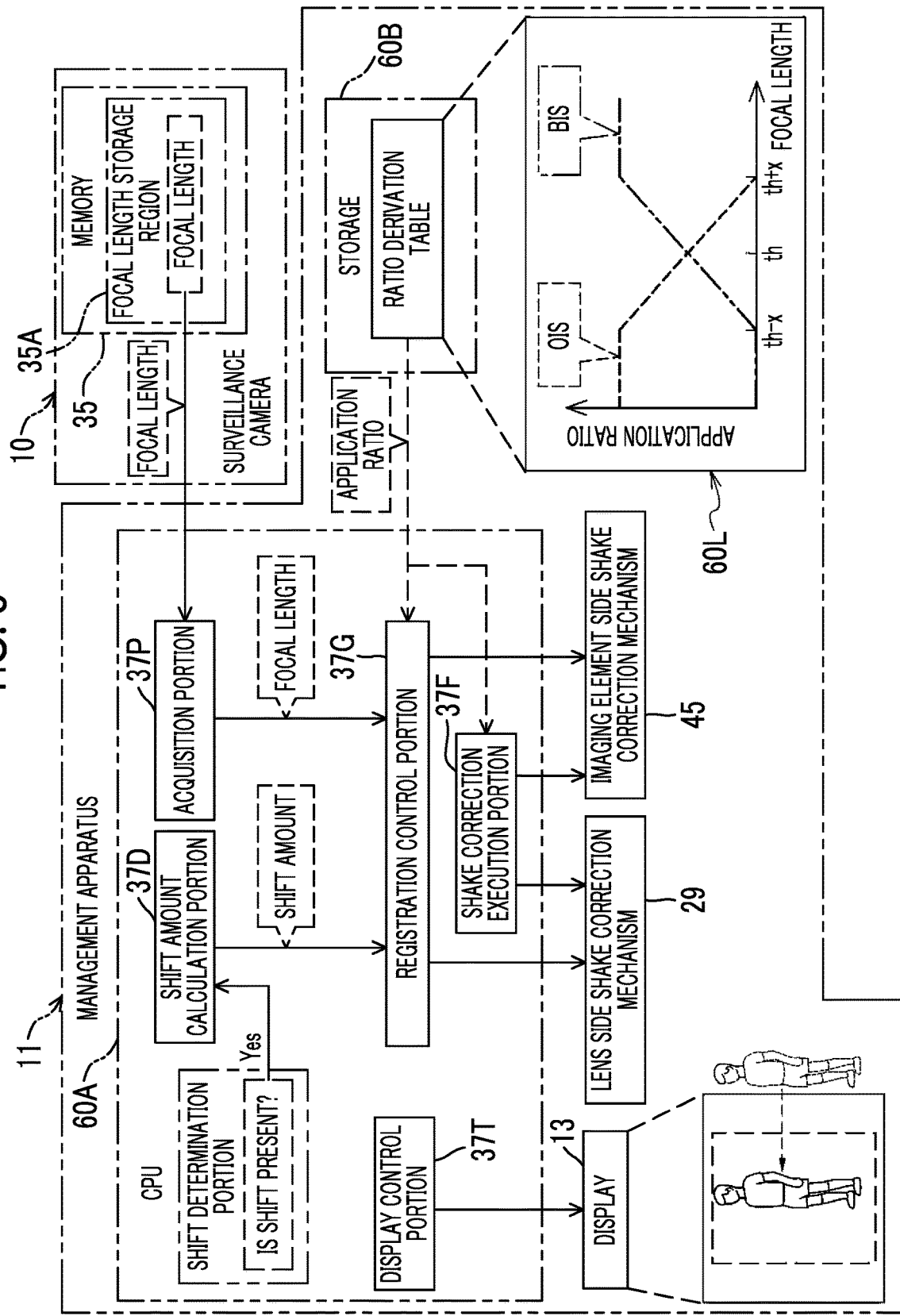
FIG. 8 is a function block diagram illustrating an example of the functions of the CPU included in the management apparatus according to the first embodiment.
Figure 9:
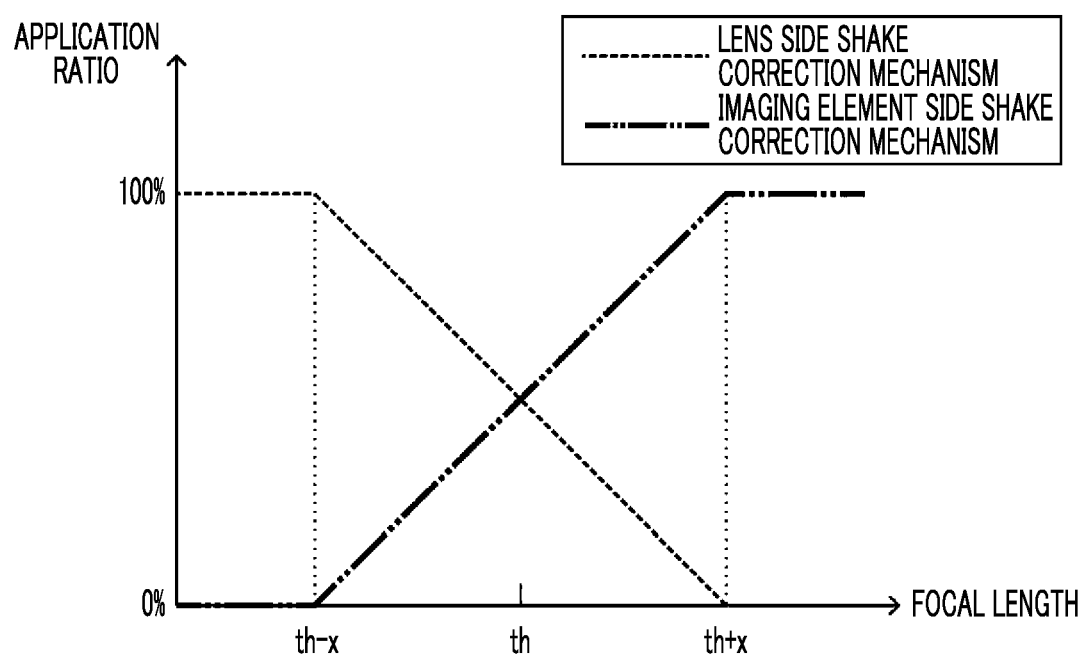
FIG. 9 is a function block diagram illustrating an example of functions of the management apparatus in a case where the management apparatus uses a ratio derivation table according to the first embodiment.

As illustrated in FIG. 8 as an example, the storage 60B stores a ratio derivation table 60L. As illustrated in FIG. 9 as an example, the ratio derivation table 60L is used by the registration control portion 37G in a registration control. The ratio derivation table 60L is a table indicating whether to increase a ratio of application of the imaging element side shake correction mechanism 45 to the lens side shake correction mechanism 29 or increase a ratio of application of the lens side shake correction mechanism 29 to the imaging element side shake correction mechanism 45, in accordance with the focal length acquired by the acquisition portion 37P.

Hereinafter, for convenience of description, the ratio of application of the imaging element side shake correction mechanism 45 to the lens side shake correction mechanism 29 will be referred to as a "first application ratio", and the ratio of application of the lens side shake correction mechanism 29 to the imaging element side shake correction mechanism 45 will be referred to as a "second application ratio". In addition, the first application ratio and the second application ratio will be referred to as the "application ratio" unless otherwise necessary to distinguish therebetween. In addition, here, while the imaging element side shake correction mechanism 45 is illustrated as an element defining the application ratio, the disclosed technology is not limited thereto. The electronic shake correction portion 33 may be applied instead of the imaging element side shake correction mechanism 45 or together with the imaging element side shake correction mechanism 45.

In the examples illustrated in FIG. 8 and FIG. 9, in a case where the focal length is less than a threshold value th, a ratio of use of the lens side shake correction mechanism 29 is higher than the imaging element side shake correction mechanism 45. In a case where the focal length is greater than or equal to the threshold value th, a ratio of use of the imaging element side shake correction mechanism 45 is higher than the lens side shake correction mechanism 29.

Particularly, in a case where the focal length is within a predetermined range including the threshold value th, increasing the focal length gradually decreases the first application ratio and gradually increases the second application ratio. Examples of the predetermined range include, as illustrated in FIG. 8 and FIG. 9, a range of x on a negative side and a positive side from the threshold value th, that is, a range of greater than or equal to "threshold value th−x" and less than or equal to "threshold value th+x" (hereinafter, referred to as the "predetermined range"). Here, "threshold value th−x" is an example of a "lower limit value of a defined range" according to the embodiment of the disclosed technology, and "threshold value th+x" is an example of an "upper limit value of the defined range" according to the embodiment of the disclosed technology. In the predetermined range, the first application ratio is linearly decreased, and the second application ratio is linearly increased. Here, while an example of a form in which the first application ratio is linearly decreased, and the second application ratio is linearly increased is illustratively described, the disclosed technology is not limited thereto. In the predetermined range, the first application ratio may be non-linearly (for example, exponentially) decreased, and the second application ratio may be non-linearly (for example, exponentially) increased. In addition, in the predetermined range, one of the first application ratio and the second application ratio may non-linearly change, and the other may linearly change. Even in this case, the first application ratio may be decreased, and the second application ratio may be increased.

In a case where the focal length is within the predetermined range, only the lens side shake correction mechanism 29 is used in the registration control. In a case where the focal length is within a range exceeding "threshold value th−x", only the imaging element side shake correction mechanism 45 is used in the registration control.

One of the lens side shake correction mechanism 29 and the imaging element side shake correction mechanism 45 having a lower application ratio is used for shake correction by the shake correction execution portion 37F and can exhibit an effect of correcting the shake. For example, in a case where the focal length exceeds "threshold value th+x", the lens side shake correction mechanism 29 is used for correcting the shake by the shake correction execution portion 37F. In a case where the focal length is less than "threshold value th−x", the imaging element side shake correction mechanism 45 is used for correcting the shake by the shake correction execution portion 37F.

Here, while the ratio derivation table 60L is illustrated, the disclosed technology is not limited thereto. A calculation expression for ratio calculation that takes the focal length as an independent variable and takes the application ratio as a dependent variable may be used instead of the ratio derivation table 60L.

The registration control portion 37G performs the registration control. The registration control is a control including a registration control of setting the subject image position detected by the subject image detection portion 37A to the specific position in the captured image by increasing the first application ratio in a case where the focal length acquired by the acquisition portion 37P is greater than or equal to the threshold value, and increasing the second application ratio in a case where the focal length is less than the threshold value. Specifically, in the registration control, the application ratio corresponding to the shift amount calculated in the shift amount calculation portion 37D is derived by the registration control portion 37G from the ratio derivation table 60L stored in the storage 60B. In the registration control, the subject image position is set to the specific position in the captured image by driving the lens side shake correction mechanism 29 and/or the imaging element side shake correction mechanism 45 by the registration control portion 37G in accordance with the derived application ratio.

Figure 10B:
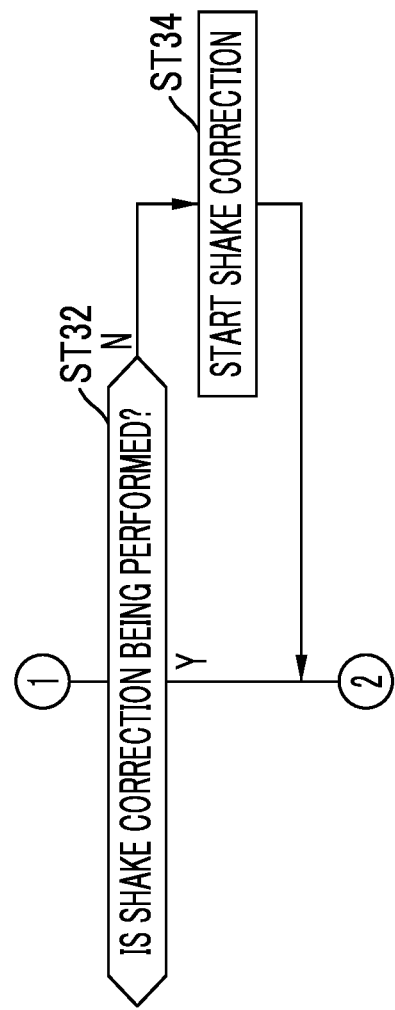
FIG. 10B is a continuation of the flowchart illustrated in FIG. 10A.

Next, actions of parts of the surveillance system 2 according to the embodiment of the disclosed technology will be described with reference to FIG. 10A and FIG. 10B. FIG. 10A and FIG. 10B illustrate an example of a flow of registration control processing executed by the CPU 60A in accordance with the registration control processing program 36A. The flow of registration control processing illustrated in FIG. 10A and FIG. 10B is an example of an "imaging support method" according to the embodiment of the disclosed technology.

In the registration control processing illustrated in FIG. 10A and FIG. 10B, first, in step ST10, the acquisition portion 37P determines whether or not a timing (hereinafter, referred to as a "focal length acquisition timing") at which the focal length is acquired is reached. Examples of the focal length acquisition timing include a timing at which the target subject is imaged at the predetermined frame rate in the imaging element 25. More specifically, in a case where the frame rate is 60 frames/second, and the acquisition portion 37P acquires the focal length for each frame, the focal length is acquired with a frequency of 60 times per second. The acquisition portion 37P may acquire the focal length for a plurality of frames. For example, the focal length may be acquired with a frequency of once for every two frames. In step ST10, in a case where the focal length acquisition timing is not reached, a negative determination is made, and the registration control processing transitions to step ST30. In step ST10, in a case where the focal length acquisition timing is reached, a positive determination is made, and the registration control processing transitions to step ST12.

In step ST12, the acquisition portion 37P acquires the most recent focal length of the surveillance camera 10. The registration control processing transitions to step ST14.

In step ST14, the focal length change determination portion 37Q determines whether or not the focal length is changed based on the most recent focal length acquired in step ST12 and the previous focal length in the internal memory 37M. In step ST14, in a case where the focal length is not changed, a negative determination is made, and the registration control processing transitions to step ST32 illustrated in FIG. 10B. In step ST14, in a case where the focal length is changed, a positive determination is made, and the registration control processing transitions to step ST16.

In step ST16, the focal length change determination portion 37Q updates the value of the previous focal length stored in the internal memory 37M to the value of the most recent focal length.

In subsequent step ST18, the subject image detection portion 37A determines whether or not the target subject image is detected from the captured image. In step ST18, in a case where the target subject image is not detected from the captured image, a negative determination is made, and the registration control processing transitions to step ST30. In step ST18, in a case where the target subject image is detected from the captured image, a positive determination is made, and the registration control processing transitions to step ST20.

In step ST20, the image position determination portion 37B detects the subject image position in the captured image. The registration control processing transitions to step ST21.

In subsequent step ST21, the shift amount calculation portion 37D calculates the shift amount. The registration control processing transitions to step ST22.

In step ST22, the shift determination portion 37E determines whether or not there is a shift between the subject image position and the center region based on the shift amount detected in step ST21. In step ST22, in a case where there is no shift, a negative determination is made, and the registration control processing transitions to step ST32. In step ST22, in a case where there is a shift, a positive determination is made, and the registration control processing transitions to step ST24.

In step ST24, the shake correction execution portion 37F derives the application ratio corresponding to the most recent focal length acquired in step ST12 from the ratio derivation table 60L.

In subsequent step ST25, the shake correction execution portion 37F determines whether or not the shake correction is being performed. That is, a determination as to whether or not the correction of the shake by the shake correction portion 24 is being performed (hereinafter, referred to as "shake correction is being performed"). In step ST25, in a case where the shake correction is not being performed, a negative determination is made, and the registration control processing transitions to step ST28. In step ST25, in a case where the shake correction is being performed, a positive determination is made, and the registration control processing transitions to step ST26.

In step ST26, the shake correction execution portion 37F causes the shake correction portion 24 to finish the correction of the shake. The registration control processing transitions to step ST28.

In step ST28, the registration control portion 37G executes the registration control in accordance with the shift amount calculated in step ST21 and the application ratio acquired in step ST12.

In subsequent step ST30, the registration control portion 37G determines whether or not a condition (hereinafter, referred to as a "finish condition") under which the registration control processing is finished is satisfied. Examples of the finish condition include a condition that an instruction to finish the registration control processing is received by the reception device 62. In step ST30, in a case where the finish condition is not satisfied, a negative determination is made, and the registration control processing transitions to step ST10. In step ST30, in a case where the finish condition is satisfied, a positive determination is made, and the registration control processing is finished.

In step ST32, the shake correction execution portion 37F determines whether or not the shake correction is being performed. In step ST32, in a case where the shake correction is being performed, a positive determination is made, and the registration control processing transitions to step ST30. In step ST32, in a case where the shake correction is not being performed, a negative determination is made, and the registration control processing transitions to step ST34.

In step ST34, the shake correction execution portion 37F starts the shake correction. A transition is made to step ST30.

In the surveillance system 2, the registration control of setting the subject image position to the center region in the captured image is performed. Since the subject image position is present in the center region in the captured image, a state where the subject image is easily visible can be implemented.

In the present embodiment, in a case of performing the registration control, the application ratio of the lens side shake correction mechanism 29 and the imaging element side shake correction mechanism 45 is derived in accordance with the focal length of the surveillance camera 10. Specifically, the registration control is performed by increasing the ratio of use of the lens side shake correction mechanism 29 compared to the imaging element side shake correction mechanism 45 in a case where the focal length is less than the threshold value th, and increasing the ratio of use of the imaging element side shake correction mechanism 45 compared to the lens side shake correction mechanism 29 in a case where the focal length is greater than or equal to the threshold value th.

Here, FIG. 11A and FIG. 11B illustrate an example of a relationship between the imaging range in which the target subject is imaged, and the position of the target subject image in the captured image in a case where the focal length of the surveillance camera 10 is on the wide angle side out of the telephoto side and the wide angle side. In the examples illustrated in FIG. 11A and FIG. 11B, the target subject image is in the center region of the captured image.

In this state, in a case where the target subject moves, the subject image position is shifted from the center region of the captured image as illustrated in FIG. 12A and FIG. 12B as an example. However, in the examples illustrated in FIG. 12A and FIG. 12B, the subject image position is within a range of the captured image.

Figure 13B:
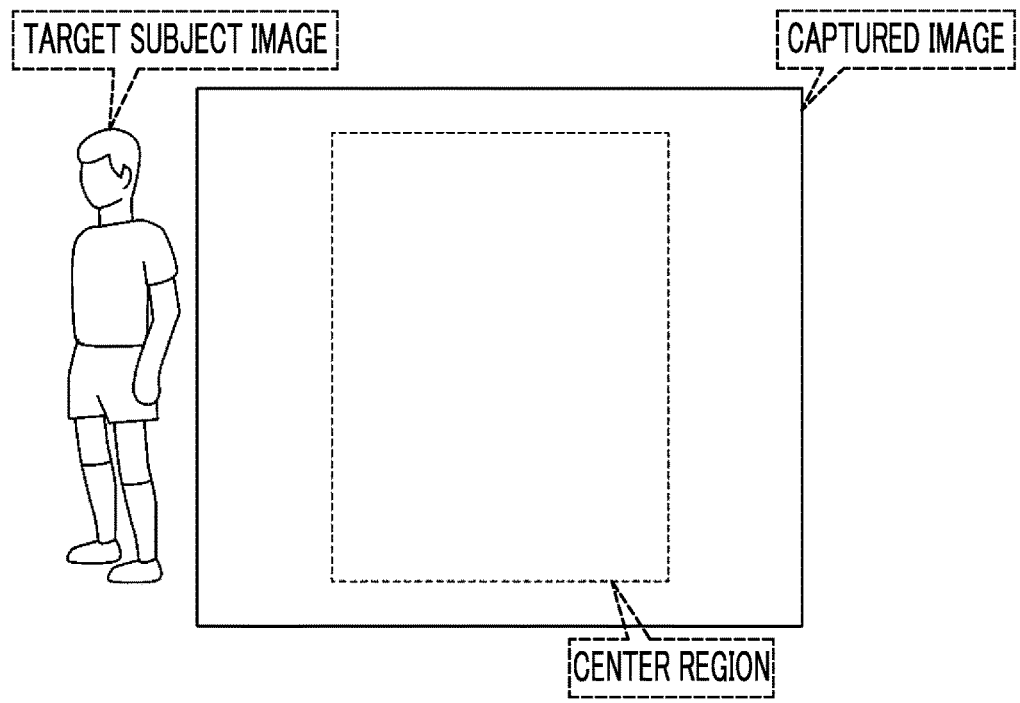
FIG. 13B is a schematic image diagram illustrating an example of the captured image obtained by capturing the imaging region illustrated in FIG. 13A by the surveillance camera.

In a case where magnification is changed for the focal length of the surveillance camera 10 to the telephoto side out of the telephoto side and the wide angle side from the state illustrated in FIG. 12A and FIG. 12B, the angle of view is narrowed. As illustrated in FIG. 13A and FIG. 13B as an example, the subject image position may be positioned outside the range of the captured image.

Figure 14:
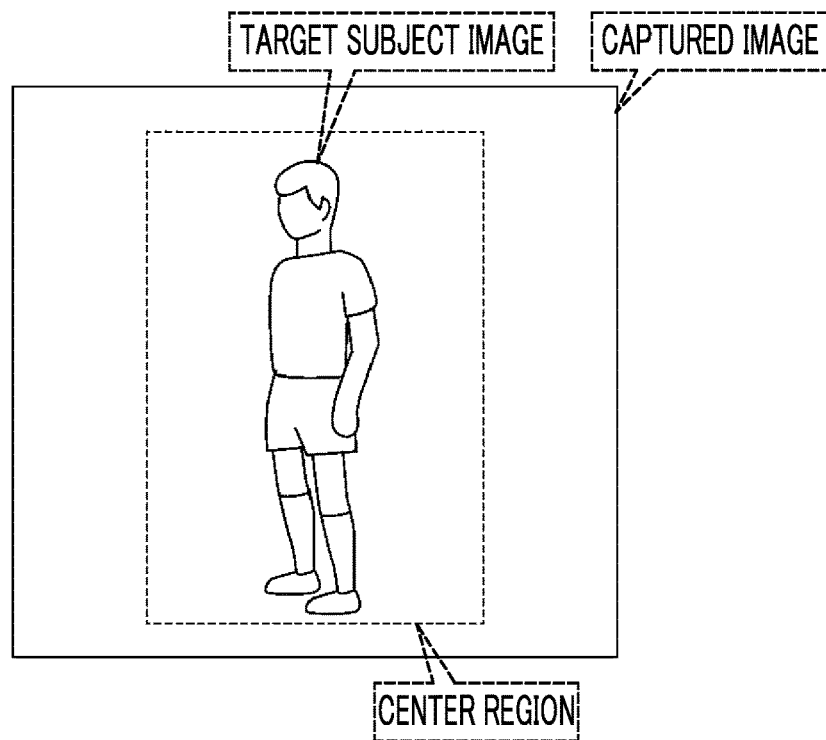
FIG. 14 is a schematic image diagram illustrating an example of the captured image in which a target subject image is caused to fall within a center region of the captured image by operating a shake correction portion according to the first embodiment.

In such a manner, in a case where the subject image position is positioned outside the range of the captured image or outside the center region, the registration control processing is performed, and the lens side shake correction mechanism 29 and the imaging element side shake correction mechanism 45 operate at the application ratio corresponding to the focal length in the present embodiment. Accordingly, as illustrated in FIG. 14 as an example, the subject image position can be positioned in the center region in the captured image.

In the present embodiment, in a case of performing the registration control processing, as illustrated in FIG. 8 and FIG. 9 as an example, in a case where the focal length is greater than or equal to the threshold value th, the application ratio of the imaging element side shake correction mechanism 45 is set to be higher than the application ratio of the lens side shake correction mechanism 29. Since the imaging element side shake correction mechanism 45 moves the light-receiving surface 25A on which the image of the light from the subject is formed, the subject image position can be set to the center region independently of the focal length.

Meanwhile, in a case where the focal length is less than the threshold value th, the ratio of application of the lens side shake correction mechanism 29 is set to be higher than the ratio of application of the imaging element side shake correction mechanism 45. The lens side shake correction mechanism 29 sets the position of the subject image position to the center region by inclining the optical axis OA compared to the optical axis OA before the operation of the lens side shake correction mechanism 29. Accordingly, by moving the anti-vibration lens 15B1 in the direction perpendicular to the optical axis OA, the position of the subject image position can be set to the center region.

As described above, the surveillance camera 10 comprises an imaging support device 44. In the imaging support device 44, the registration control is performed by increasing the ratio of application of the imaging element side shake correction mechanism 45 in a case where the focal length of the surveillance camera 10 is greater than or equal to the threshold value th, and increasing the ratio of application of the lens side shake correction mechanism 29 in a case where the focal length is less than the threshold value th. Thus, according to the present configuration, the subject image position can be set to the center region (an example of the specific position) in the captured image compared to a case of performing the registration control depending on only the imaging element side shake correction mechanism 45 or the lens side shake correction mechanism 29 regardless of the focal length.

In the present embodiment, in a case where the focal length is greater than or equal to the threshold value th, the application ratio of the lens side shake correction mechanism 29 is lower than the application ratio of the imaging element side shake correction mechanism 45 in the registration control. In this case, the lens side shake correction mechanism 29 executes a shake correction control. Accordingly, the shake can be corrected even while the registration control is being performed.

Particularly, in a case where the focal length exceeds "threshold value th+x", the lens side shake correction mechanism 29 is not used in the registration control. Thus, the shake can be corrected using the lens side shake correction mechanism 29 for only the shake correction.

Meanwhile, in a case where the focal length is less than the threshold value th, the application ratio of the imaging element side shake correction mechanism 45 is lower than the application ratio of the lens side shake correction mechanism 29 in the registration control. In this case, the shake can be corrected even while the registration control is being performed, by causing the imaging element side shake correction mechanism 45 to execute the shake correction control.

Particularly, in a case where the focal length is less than "threshold value th−x", the imaging element side shake correction mechanism 45 is not used in the registration control. Thus, the shake can be corrected using the imaging element side shake correction mechanism 45 for only the shake correction.

The surveillance camera 10 of the present embodiment includes the variable magnification mechanism. In a case where the focal length is changing, the registration control is performed using the lens side shake correction mechanism 29 and the imaging element side shake correction mechanism 45 together. In a case where the focal length is changing, the subject image position can be set to the center region of the captured image with high accuracy compared to a case of performing the registration control processing using only the lens side shake correction mechanism 29 or the imaging element side shake correction mechanism 45.

Particularly, in the present embodiment, in the surveillance camera 10 including the variable magnification mechanism, the registration control processing is performed using the lens side shake correction mechanism 29 and the imaging element side shake correction mechanism 45 together in a case where the focal length is within the range of greater than or equal to "threshold value th−x" and less than or equal to "threshold value th+x". Thus, for example, the subject image position can be set to the specific position in the captured image with high accuracy compared to a case of performing the registration control using only the imaging element side shake correction mechanism 45 or the lens side shake correction mechanism 29 at all times regardless of whether or not the focal length is within the range of greater than or equal to "threshold value th−x" and less than or equal to "threshold value th+x".

In addition, in a case where the focal length is within the range of greater than or equal to "threshold value th−x" and less than or equal to "threshold value th+x", the application ratio of the lens side shake correction mechanism 29 is linearly decreased, and the application ratio of the imaging element side shake correction mechanism 45 is linearly increased. In a case where the focal length of the surveillance camera 10 continuously changes by the variable magnification mechanism 18, rapid switching is not performed from the lens side shake correction mechanism 29 to the imaging element side shake correction mechanism 45. Accordingly, visual recognition, from the captured image, of a timing of switching from one of the registration control processing using only the lens side shake correction mechanism 29 and the registration control using only the imaging element side shake correction mechanism 45 to the other can be suppressed.

In the present embodiment, in a case where the focal length of the surveillance camera 10 is not changing, the shake correction portion 24 causes one of the lens side shake correction mechanism 29 and the imaging element side shake correction mechanism 45 to execute the shake correction control. Accordingly, a captured image in which an effect of the shake is reduced can be obtained compared to a configuration in which the shake is not corrected in a case where the focal length is not changing.

In a case where the focal length of the surveillance camera 10 is less than "threshold value th−x", the shake correction portion 24 performs the registration control by applying the lens side shake correction mechanism 29. In a case where the focal length is less than "threshold value th−x", the imaging element side shake correction mechanism 45 is not applied in the registration control. Thus, the shake correction control can be performed using the imaging element side shake correction mechanism 45. That is, room for correcting the shake can be secured.

In a case where the focal length of the surveillance camera 10 exceeds "threshold value th+x", the shake correction portion 24 performs the registration control by applying the imaging element side shake correction mechanism 45. In a case where the focal length exceeds "threshold value th+x", the lens side shake correction mechanism 29 is not applied in the registration control. Thus, the shake correction control can be performed using the lens side shake correction mechanism 29. That is, room for correcting the shake can be secured.

Second Embodiment

Next, a second embodiment will be described. In the second embodiment, the same elements, members, and the like as in the first embodiment will be designated by the same reference numerals as in the first embodiment and will not be described in detail. In addition, an overall configuration of a surveillance camera that is an example of an imaging apparatus of the second embodiment is the same as the surveillance camera 10 of the first embodiment and thus, will not be illustrated.

In the second embodiment, in performing the registration control processing, the imaging support device causes the surveillance camera 10 to revolve by operating the revolution mechanism 16 in addition to the lens side shake correction mechanism 29 and/or the imaging element side shake correction mechanism 45.

For example, in a case where the focal length is on the wide angle side out of the telephoto side and the wide angle side, and the subject image position is not in the center region, the subject image position may be able to be set in the center region by causing the surveillance camera 10 revolve by operating the revolution mechanism 16. Furthermore, even in a case where the subject image position is not in the captured image, the subject image position may be able to be set in the captured image by causing the surveillance camera 10 to revolve by operating the revolution mechanism 16.

Figure 15:
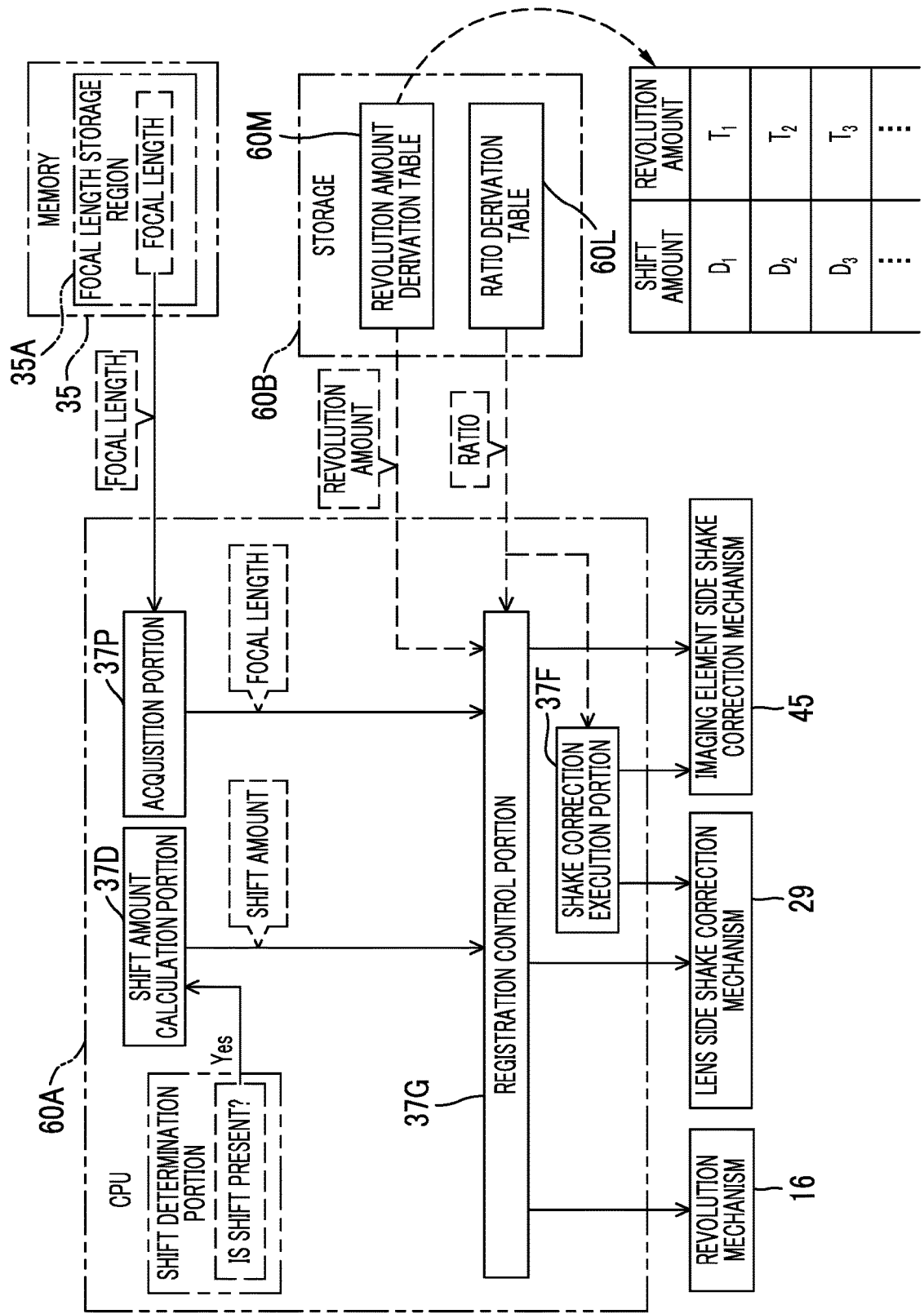
FIG. 15 is a function block diagram illustrating an example of functions of a CPU included in a management apparatus according to a second embodiment.

As illustrated in FIG. 15 as an example, the storage 60B stores a revolution amount derivation table 60M in addition to the ratio derivation table 60L. In the revolution amount derivation table 60M, the shift amount and a revolution amount of the surveillance camera 10 are associated with each other. Here, the revolution amount is information used in a case of causing the subject image position to approach the center region in the captured image based on the shift amount between the subject image position and the center region.

The revolution amount is decided in accordance with each of a pair of axial directions. That is, the revolution amount is decided in accordance with each of the direction of the pitch axis PA and the direction of the yaw axis YA. Accordingly, in the captured image, the subject image position can be caused to approach the center region CE in both directions of the direction of the pitch axis PA and the direction of the yaw axis YA. Here, while the revolution amount derivation table 60M is illustrated, the disclosed technology is not limited thereto. For example, a revolution amount derivation calculation expression that takes the shift amount as an independent variable and takes the revolution amount as a dependent variable may be applied instead of the revolution amount derivation table 60M.

The registration control portion 37G acquires the revolution amount from the revolution amount derivation table 60M. The registration control portion 37G causes the surveillance camera 10 to revolve in the pitch direction and/or the yaw direction by operating the revolution mechanism 16 with the derived revolution amount.

Figure 16A:
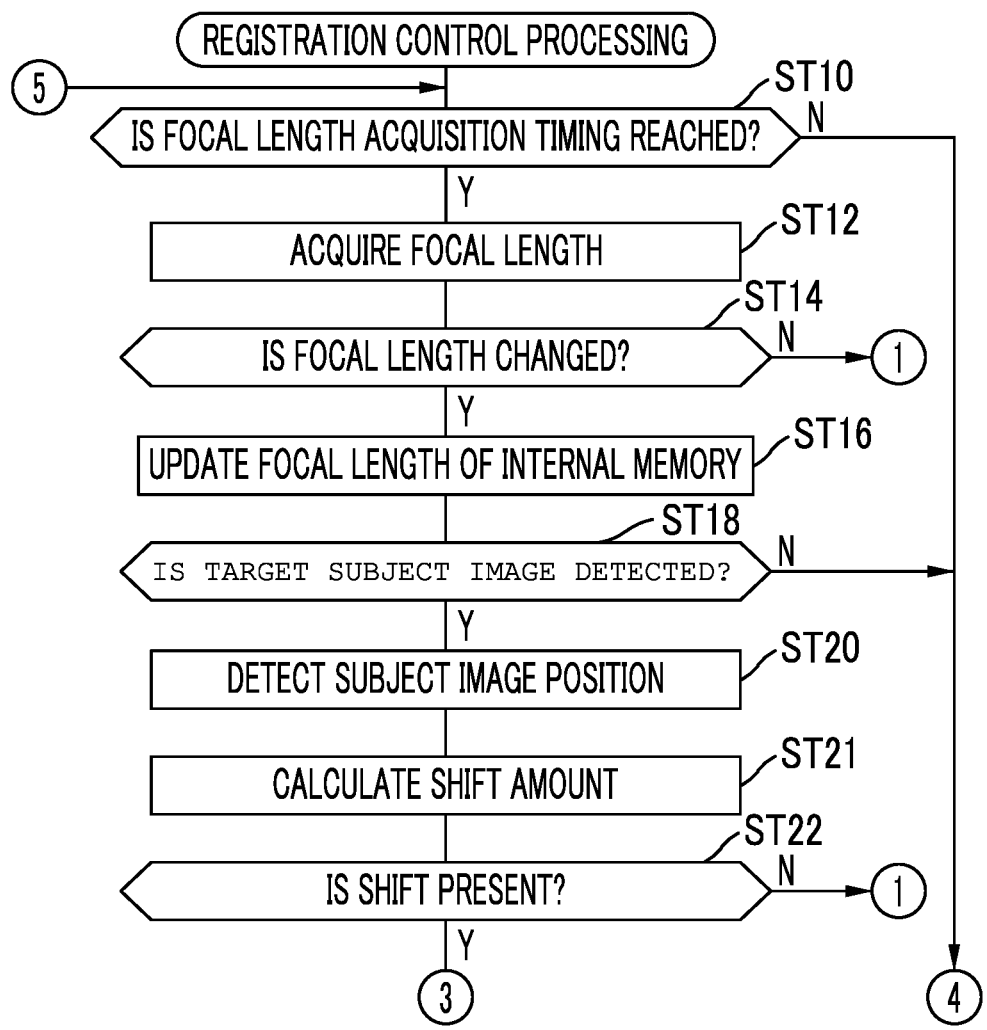
FIG. 16A is a flowchart illustrating an example of a flow of registration control processing according to the second embodiment.
Figure 16B:
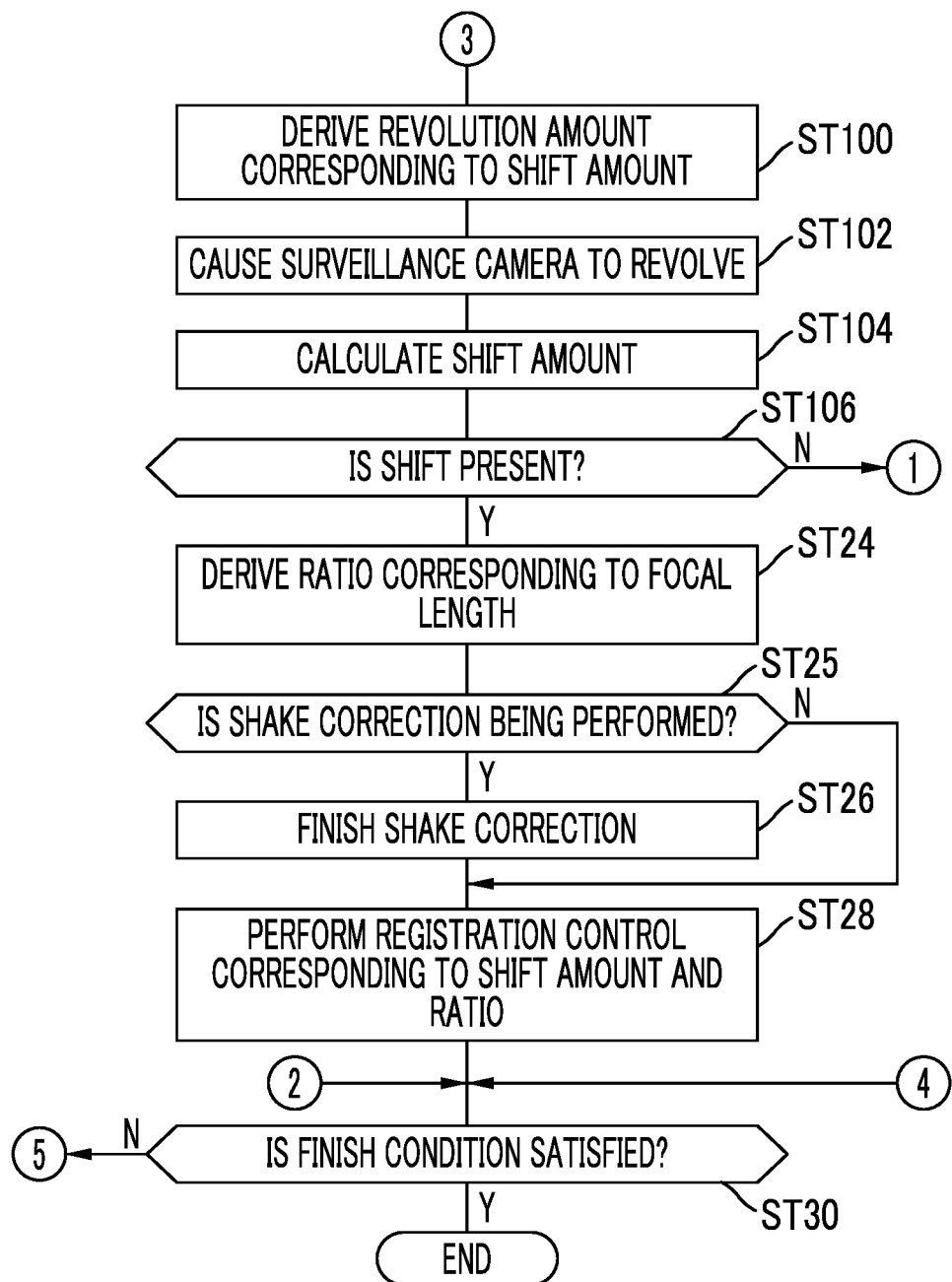
FIG. 16B is a continuation of the flowchart illustrated in FIG. 16A.

FIG. 16A and FIG. 16B illustrate an example of a flow of registration control processing executed by the CPU 60A (refer to FIG. 5) in the second embodiment. FIG. 16A and FIG. 16B are different from the flow of registration control processing illustrated in FIG. 10A and FIG. 10B, in that step ST100 to step ST106 are included between step ST22 and step ST24. The flow of registration control processing illustrated in FIG. 16A and FIG. 16B is an example of the "imaging support method" according to the embodiment of the disclosed technology. In step ST100, the registration control portion 37G derives the revolution amount corresponding to the shift amount from the revolution amount derivation table 60M stored in the storage 60B.

In step ST102, the registration control portion 37G causes the surveillance camera 10 to revolve by operating the revolution mechanism 16.

In step ST104, the registration control portion 37G calculates the shift amount.

In step ST106, the registration control portion 37G determines whether or not there is a shift. In step ST106, in a case where there is no shift, a negative determination is made, and the registration control processing transitions to step ST32 (refer to FIG. 10B). In step ST106, in a case where there is a shift, a positive determination is made, and the registration control processing transitions to step ST24.

Accordingly, in the second embodiment, in a case where there is a shift between the subject image position and the center region, the surveillance camera 10 is caused to revolve by the revolution amount corresponding to the shift amount by operating the revolution mechanism 16. By causing the surveillance camera 10 to revolve, a state where the target subject image is positioned in the captured image can be implemented in a case where the target subject image is positioned outside the captured image.

Figure 17:
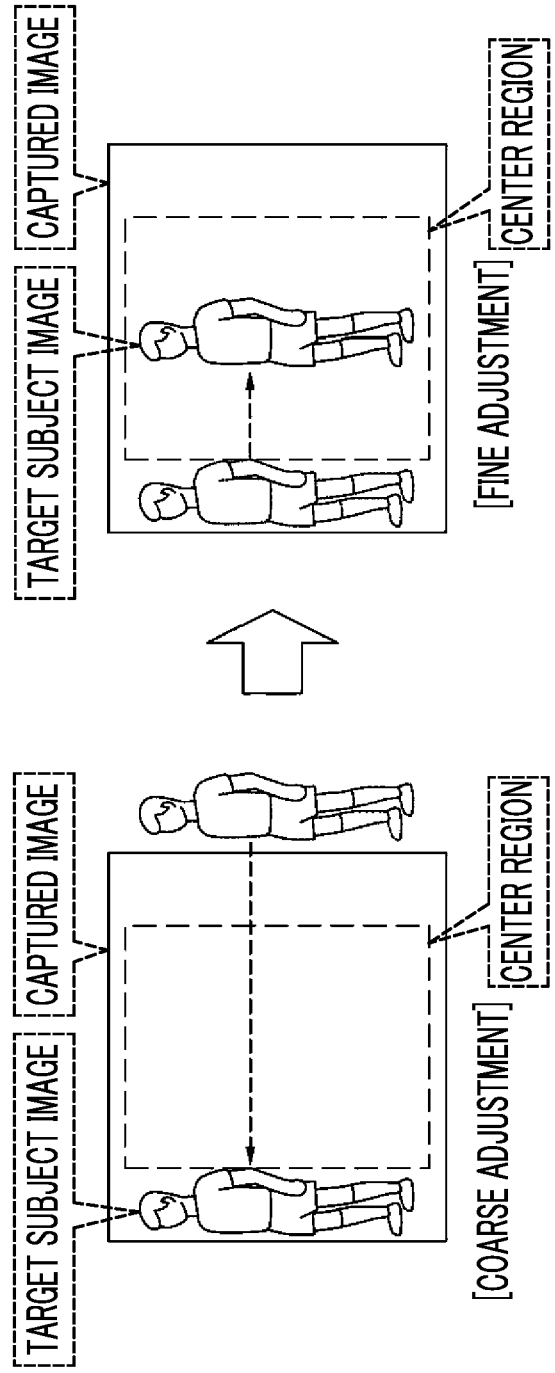
FIG. 17 is a schematic image diagram illustrating an example of the captured image obtained by performing coarse adjustment and the captured image obtained by performing fine adjustment after the coarse adjustment in the registration control processing.

Accuracy of the registration by the lens side shake correction mechanism 29 and the imaging element side shake correction mechanism 45 is high compared to the accuracy of the registration by the revolution of the surveillance camera 10. Meanwhile, the registration by the revolution of the surveillance camera 10 enables registration within a wide range for a short time period compared to the registration by the lens side shake correction mechanism 29 and the imaging element side shake correction mechanism 45. Accordingly, as illustrated in FIG. 17 as an example, coarse adjustment of the registration can be performed first by the revolution of the surveillance camera 10, and then, fine adjustment of the registration can be performed by the lens side shake correction mechanism 29 and the imaging element side shake correction mechanism 45 with higher accuracy of the registration than the registration by the revolution of the surveillance camera 10.

Particularly, in the registration control using the revolution mechanism 16, in a case where variations occur in the revolution angle based on the operation of the revolution mechanism 16, it is difficult to position the subject image position in the center region in the registration control based on the revolution mechanism 16. In the present embodiment, in the registration control, coarse adjustment of the subject image position is performed by operating the revolution mechanism 16, and then, fine adjustment of the subject image position is performed by operating the lens side shake correction mechanism 29 and/or the imaging element side shake correction mechanism 45. Thus, high accuracy of the registration control can be implemented.

In each of the embodiments, an example of applying the imaging element side shake correction mechanism 45 in the registration control in a configuration in which the surveillance camera 10 includes the imaging element side shake correction mechanism 45 and the electronic shake correction portion 33 as the image region movement portion is illustrated. However, the image region movement portion to be applied in the registration control may be the electronic shake correction portion 33, or the imaging element side shake correction mechanism 45 and the electronic shake correction portion 33 may be used together.

In each of the embodiments, a case where, in the registration control processing, the shift amount of the subject image position is calculated, and the registration control is performed in a case where there is a shift is illustrated. Meanwhile, a threshold value (hereinafter, referred to as a "shift threshold value") may be set for the shift amount of the subject image position, and in a case where the shift amount is greater than or equal to the shift threshold value, the registration control may be performed by operating the shake correction portion 24.

In this case, for example, the shift amount may be calculated at a constant timing regardless of whether or not the focal length of the surveillance camera 10 changes. For example, even in a state where the focal length of the surveillance camera 10 does not change and is maintained on the wide angle side, the position of the target subject may be outside the center region while the position of the target subject is inside the captured image, due to movement of the target subject or the like. In a case where the shift amount in this state is large, and magnification is changed to the telephoto side by the variable magnification mechanism 18, the subject image may be enlarged and move outside the captured image. Accordingly, the shift threshold value can be set based on whether or not the subject image position outside the center region moves outside the captured image due to the changing of magnification from the wide angle side to the telephoto side.

Particularly, in a case where the shake correction portion is operated, a state where the center of the captured image is shifted from the optical axis is set. Thus, even in a case where the subject image position is in the center region, changing magnification for the focal length to the telephoto side in this state may move the subject image position outside the captured image. In this case, by performing the registration control, the subject image position can be set to the center region with high accuracy compared to a configuration of not performing the registration control.

In the present embodiment, the lens side shake correction mechanism 29 is illustrated as an example of the "lens moving mechanism" according to the embodiment of the disclosed technology. The imaging element side shake correction mechanism 45 and the electronic shake correction portion 33 are illustrated as an example of the "image region movement portion (image region movement component)" according to the embodiment of the disclosed technology. All of the lens side shake correction mechanism 29, the imaging element side shake correction mechanism 45, and the electronic shake correction portion 33 are an example of the shake correction portion and are applied for correcting the shift of the subject image position. However, the lens moving mechanism according to the embodiment of the disclosed technology is not limited to a mechanism for correcting the shift of the subject image position and may have a configuration in which a lens can be moved in a direction intersecting with the optical axis OA. The image region movement portion according to the embodiment of the disclosed technology is also not limited to a configuration for correcting the shift of the subject image position as long as the region of the captured image in the imaging element 25 can be moved in the direction intersecting with the optical axis OA.

The center region described in the embodiments is an example of the "specific position" according to the embodiment of the disclosed technology. The "specific position" is not limited to the center region in the captured image and may be a position shifted from the center of the captured image in the pitch direction and the yaw direction. By setting the specific position as the center region in the captured image, the subject image position can be set to the center in the captured image.

In addition, in the surveillance camera 10, the shake is corrected by moving the anti-vibration lens 15B1. Accordingly, it is possible to correct the shake within a movable range of the anti-vibration lens 15B1 and set the subject image position to the center region.

Figure 18:
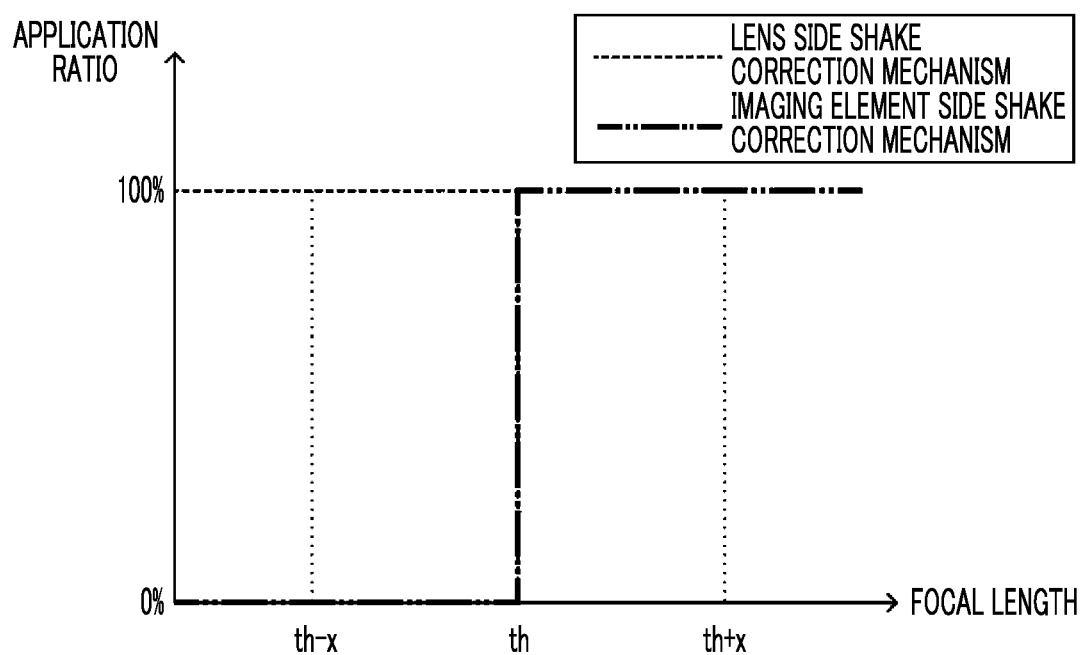
FIG. 18 is a graph illustrating an example of the ratio derivation table different from FIG. 9 for an application ratio of a lens side shake correction mechanism and an imaging element side shake correction mechanism in an imaging support device.

In the embodiments, as illustrated in FIG. 9 as an example, an example in which in a case where the focal length is within the predetermined range, the ratio of application of the lens side shake correction mechanism 29 is linearly decreased, and the ratio of application of the imaging element side shake correction mechanism 45 is linearly increased in the registration control is illustrated. Meanwhile, for example, as illustrated in FIG. 18, a control of setting the application ratio of the lens side shake correction mechanism 29 to 100% in a case where the focal length is less than the threshold value th, and setting the application ratio of the imaging element side shake correction mechanism 45 to 100% in a case where the focal length is greater than or equal to the threshold value th may be performed. In the control illustrated in FIG. 18 as an example, since only one of the lens side shake correction mechanism 29 and the imaging element side shake correction mechanism 45 is applied in accordance with whether or not the focal length is greater than or equal to the threshold value th, the registration control is facilitated.

Figure 19:
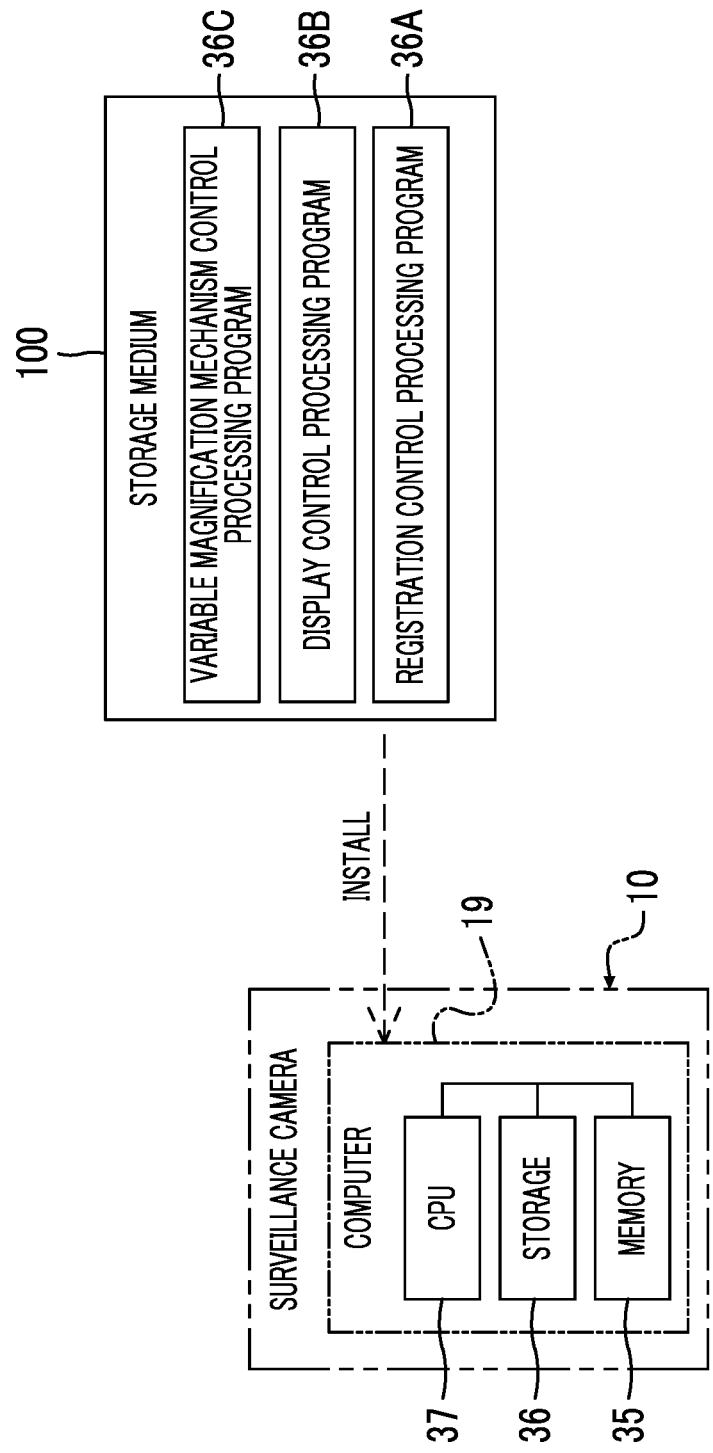
FIG. 19 is a conceptual diagram illustrating an example of an aspect in which a display control processing program and a variable magnification mechanism control processing program are installed on a computer in the surveillance camera from a storage medium storing a registration control processing program, the display control processing program, and the variable magnification mechanism control processing program according to the embodiments.

In each of the embodiments, the storage 60B of the management apparatus 11 stores the registration control processing program 36A, the display control processing program 36B, and the variable magnification mechanism control processing program 36C. An example of a form of executing these programs in the memory 60C of the management apparatus 11 is illustrated. The disclosed technology is not limited thereto. For example, an example in which these programs are stored in the storage 36 of the surveillance camera 10, and the CPU 37 of the surveillance camera 10 executes these programs in the memory 35 may be applied. Furthermore, as illustrated in FIG. 19 as an example, the registration control processing program 36A, the display control processing program 36B, and the variable magnification mechanism control processing program 36C may be stored in a storage medium 100 that is a non-transitory storage medium. In a case of the example illustrated in FIG. 19, the registration control processing program 36A, the display control processing program 36B, and the variable magnification mechanism control processing program 36C stored in the storage medium 100 are installed on the control device 60. The CPU 60A executes above each processing in accordance with the registration control processing program 36A, the display control processing program 36B, and the variable magnification mechanism control processing program 36C.

In the example illustrated in FIG. 5, the CPU 60A is a single CPU. However, the disclosed technology is not limited thereto, and a plurality of CPUs may be employed. Examples of the storage medium 100 include any portable storage medium such as an SSD or a USB memory.

In addition, the registration control processing program 36A may be stored in a storage portion of another computer, a server apparatus, or the like connected to the computer 19 through a communication network (not illustrated), and the registration control processing program 36A may be downloaded to the computer 19 in response to a request of the surveillance camera 10. In this case, the downloaded registration control processing program 36A is executed by the CPU 37 of the computer 19.

In addition, in the example illustrated in FIG. 16, while an aspect in which the registration control processing program 36A, the display control processing program 36B, and the variable magnification mechanism control processing program 36C are installed on the control device 60 of the management apparatus 11 is illustrated, the disclosed technology is not limited thereto. The registration control processing program 36A, the display control processing program 36B, and the variable magnification mechanism control processing program 36C may be installed on the computer 19 of the surveillance camera 10. In this case, the CPU 37 executes the registration control processing in accordance with the registration control processing program 36A, executes display control processing described above in accordance with the display control processing program 36B, and executes variable magnification mechanism control processing described above in accordance with the variable magnification mechanism control processing program 36C. In addition, the registration control processing, the display control processing, and the variable magnification mechanism control processing may be performed in a distributed manner between the surveillance camera 10 and the management apparatus 11. For example, the registration control may be executed by the CPU 60A of the management apparatus 11, and the display control and the variable magnification mechanism control may be executed by the CPU 37 of the surveillance camera 10.

In addition, in the embodiments, while an example of a form of implementing the variable magnification mechanism control portion 37S, the display control portion 37T, the acquisition portion 37P, the focal length change determination portion 37Q, the subject image detection portion 37A, the image position determination portion 37B, the shift amount calculation portion 37D, the shift determination portion 37E, and the registration control portion 37G by a software configuration using the control device 60 is illustratively described, the disclosed technology is not limited thereto. For example, the variable magnification mechanism control portion 37S, the display control portion 37T, the acquisition portion 37P, the focal length change determination portion 37Q, the subject image detection portion 37A, the image position determination portion 37B, the shift amount calculation portion 37D, the shift determination portion 37E, and/or the registration control portion 37G may be implemented by, for example, a device including an ASIC, an FPGA, and/or a PLD. In addition, the variable magnification mechanism control portion 37S, the display control portion 37T, the acquisition portion 37P, the focal length change determination portion 37Q, the subject image detection portion 37A, the image position determination portion 37B, the shift amount calculation portion 37D, the shift determination portion 37E, and/or the registration control portion 37G may be implemented by a combination of a hardware configuration and a software configuration.

Various processors illustrated below can be used as a hardware resource for executing the registration control processing, the display control processing, and the variable magnification mechanism control processing (hereinafter, these processing will be collectively referred to as "control processing"). Examples of the processors include a CPU that is a general-purpose processor functioning as the hardware resource for executing the control processing by executing software, that is, the programs. In addition, examples of the processors include a dedicated electric circuit such as an FPGA, a PLD, or an ASIC that is a processor having a circuit configuration dedicatedly designed to execute specific processing. Any of the processors incorporates or is connected to a memory, and any of the processors executes the control processing using the memory.

The hardware resource for executing the control processing may be configured with one of those various processors or may be configured with a combination of two or more processors of the same type or different types (for example, a combination of a plurality of FPGAs or a combination of a CPU and an FPGA). In addition, the hardware resource for executing the control processing may be one processor.

Examples of a configuration with one processor include, first, a form in which one processor is configured with a combination of one or more CPUs and software, and the processor functions as the hardware resource for executing processing of each of the variable magnification mechanism control portion 37S, the display control portion 37T, the acquisition portion 37P, the focal length change determination portion 37Q, the subject image detection portion 37A, the image position determination portion 37B, the shift amount calculation portion 37D, the shift determination portion 37E, and the registration control portion 37G. Second, as represented by an SoC or the like, a form of using a processor that implements, by one IC chip, functions of the entire system including a plurality of hardware resources for executing the registration control processing is included. In such a manner, the processing of each of the variable magnification mechanism control portion 37S, the display control portion 37T, the acquisition portion 37P, the focal length change determination portion 37Q, the subject image detection portion 37A, the image position determination portion 37B, the shift amount calculation portion 37D, the shift determination portion 37E, and the registration control portion 37G is implemented using one or more of the various processors as the hardware resource.

Furthermore, more specifically, an electric circuit in which circuit elements such as semiconductor elements are combined can be used as a hardware structure of those various processors.

In addition, the registration control processing is merely an example. Accordingly, unnecessary steps may be deleted, new steps may be added, or a processing order may be rearranged without departing from the gist of the disclosed technology.

In addition, in each of the embodiments, while the surveillance camera 10 is illustrated as an example of the imaging apparatus according to the embodiment of the disclosed technology, the disclosed technology is not limited thereto. For example, the disclosed technology can also be applied to various electronic apparatuses such as a portable lens-interchangeable camera, a portable fixed lens camera, a personal computer, a smart device, or a wearable terminal apparatus instead of the surveillance camera 10. The same actions and effects as the surveillance camera 10 described in each of the embodiments are also obtained for these electronic apparatuses.

In addition, the control processing is merely an example. Accordingly, unnecessary steps may be deleted, new steps may be added, or a processing order may be rearranged without departing from the gist of the disclosed technology.

Above described contents and illustrated contents are detailed description for parts according to the embodiment of the disclosed technology and are merely an example of the disclosed technology. For example, description related to the above configurations, functions, actions, and effects is description related to an example of configurations, functions, actions, and effects of the parts according to the embodiment of the disclosed technology. Thus, unnecessary parts may be removed, new elements may be added, or parts may be replaced in the above described contents and the illustrated contents without departing from the gist of the disclosed technology. In addition, particularly, description related to common technical knowledge or the like that does not need to be described in terms of embodying the disclosed technology is omitted in the above described contents and the illustrated contents in order to avoid complication and facilitate understanding of the parts according to the embodiment of the disclosed technology.

In the present specification, "A and/or B" has the same meaning as "at least one of A or B". This means that "A and/or B" may be only A, only B, or a combination of A and B. In addition, in the present specification, the same approach as "A and/or B" is applied to a case where three or more matters are represented by connecting the matters with "and/or".

All documents, patent applications, and technical standards disclosed in the present specification are incorporated in the present specification by reference to the same extent as in a case where each of the documents, patent applications, technical standards are specifically and individually indicated to be incorporated by reference.

The following appendix is further disclosed with respect to the embodiments.

APPENDIX

An information processing apparatus including a processor, and a memory that is incorporated in or connected to the processor, in which the processor is configured to acquire a focal length of an imaging apparatus which includes a lens and an imaging element and includes a lens moving mechanism which moves the lens in a direction intersecting with an optical axis of the lens, and an image region movement portion which moves a region of a captured image in the imaging element in the direction intersecting with the optical axis, detect a subject image position of a target subject image showing a target subject in the captured image obtained by capturing an imaging region including the target subject by the imaging apparatus, and perform a registration control of setting the detected subject image position to a specific position in the captured image by increasing a ratio of application of the image region movement portion compared to the lens moving mechanism in a case where the acquired focal length is greater than or equal to a threshold value, and increasing a ratio of application of the lens moving mechanism compared to the image region movement portion in a case where the focal length is less than the threshold value.

What is claimed is:

1. An imaging support device comprising:
a processor; and
a memory that is incorporated in or connected to the processor,
wherein the processor is configured to
acquire a focal length of an imaging apparatus which includes a lens and an imaging element and includes a lens moving mechanism which moves the lens in a direction intersecting with an optical axis of the lens, and an image region movement component which moves a region of a captured image in the imaging element in the direction intersecting with the optical axis,
detect a subject image position of a target subject image showing a target subject in the captured image obtained by capturing an imaging region including the target subject by the imaging apparatus,
perform registration control for setting the detected subject image position to a specific position in the captured image by changing an application ratio of the lens moving mechanism and the image region movement component in accordance with the acquired focal length, and
cause the lens moving mechanism to correct shake caused by vibration applied to the imaging apparatus in a case where the focal length is greater than or equal to a threshold value, and cause the image region movement component to correct the shake in a case where the focal length is less than the threshold value.

2. The imaging support device according to claim 1, wherein the lens moving mechanism is a lens side shake correction mechanism that corrects a shake occurring due to a vibration exerted on the imaging apparatus, by moving the lens, and
the image region movement component is an imaging element side shake correction component that corrects the shake by moving the imaging element or performing image processing on the captured image obtained by imaging performed by the imaging element.

3. The imaging support device according to claim 2, wherein the processor is configured to, by changing the application ratio, perform the registration control and cause the lens side shake correction mechanism to correct the shake.

4. The imaging support device according to claim 2, wherein the processor is configured to, by changing the application ratio, perform the registration control and cause the imaging element side shake correction component to correct the shake.

5. The imaging support device according to claim 1, wherein the imaging apparatus includes a variable magnification mechanism that enables the focal length to change, and
the processor is configured to perform the registration control using an imaging element side shake correction component and a lens side shake correction mechanism together in a case where the acquired focal length is changing.

6. The imaging support device according to claim 1, wherein the processor is configured to cause at least one of the imaging element side shake correction component or the lens side shake correction mechanism to correct the shake in a case where the acquired focal length is not changing.

7. The imaging support device according to claim 1, wherein the processor is configured to perform the registration control using the lens side shake correction mechanism and the imaging element side shake correction component together in accordance with the application ratio.

8. The imaging support device according to claim 7, wherein the registration control is a control including a control of gradually increasing the ratio of application of the imaging element side shake correction component compared to the lens side shake correction mechanism in accordance with increasing of the focal length in a case where the focal length acquired by the processor is within a predetermined range, and
the ratio is a ratio used as the application ratio.

9. The imaging support device according to claim 7, wherein the processor is configured to perform the registration control using the lens side shake correction mechanism out of the lens side shake correction mechanism and the imaging element side shake correction component in a case where the acquired focal length is less than a lower limit value of a predetermined range.

10. The imaging support device according to claim 7, wherein the processor is configured to perform the registration control using the imaging element side shake correction component out of the lens side shake correction mechanism and the imaging element side shake correction component in a case where the acquired focal length exceeds an upper limit value of a predetermined range.

11. The imaging support device according to claim 1, wherein the processor is configured to perform the registration control using a registration component including a revolution mechanism that enables the imaging apparatus to revolve, the imaging element side shake correction component, and the lens side shake correction mechanism, and
registration accuracy for adjusting the subject image position in the captured image is higher for the imaging element side shake correction component and the lens side shake correction mechanism than for the revolution mechanism.

12. An imaging support system comprising:
the imaging support device according to claim 11; and
the revolution mechanism,
wherein the imaging support device supports imaging performed by the imaging apparatus in a case where the revolution mechanism causes the imaging apparatus to revolve.

13. An imaging system comprising:
the imaging support device according to claim 1; and
the imaging apparatus,
wherein the imaging support device supports imaging for the imaging apparatus.

14. The imaging system according to claim 13, further comprising:
a revolution mechanism that causes the imaging apparatus to revolve.

15. An imaging support method comprising:
acquiring a focal length of an imaging apparatus which includes a lens and an imaging element and includes a lens moving mechanism which moves the lens in a direction intersecting with an optical axis of the lens, and an image region movement component which moves a region of a captured image in the imaging element in the direction intersecting with the optical axis;

detecting a subject image position of a target subject image showing a target subject in the captured image obtained by capturing an imaging region including the target subject by the imaging apparatus;

performing registration control for setting the detected subject image position to a specific position in the captured image by increasing an application ratio of the lens moving mechanism and the image region movement component in accordance with the acquired focal length, and causing the lens moving mechanism to correct shake caused by vibration applied to the imaging apparatus in a case where the focal length is greater than or equal to a threshold value, and causing the image region movement component to correct the shake in a case where the focal length is less than the threshold value.

16. A non-transitory computer-readable storage medium storing a program executable by a computer to perform a process comprising:

acquiring a focal length of an imaging apparatus which includes a lens and an imaging element and includes a lens moving mechanism which moves the lens in a direction intersecting with an optical axis of the lens, and an image region movement component which moves a region of a captured image in the imaging element in the direction intersecting with the optical axis;

detecting a subject image position of a target subject image showing a target subject in the captured image obtained by capturing an imaging region including the target subject by the imaging apparatus;

performing registration control for setting the detected subject image position to a specific position in the captured image by increasing an application ratio of the lens moving mechanism and the image region movement component in accordance with the acquired focal length, and causing the lens moving mechanism to correct shake caused by vibration applied to the imaging apparatus in a case where the focal length is greater than or equal to a threshold value, and causing the image region movement component to correct the shake in a case where the focal length is less than the threshold value.

* * * * *